(12) United States Patent
Takada

(10) Patent No.: US 8,218,757 B2
(45) Date of Patent: Jul. 10, 2012

(54) ECHO CANCELER

(75) Inventor: Masashi Takada, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1292 days.

(21) Appl. No.: 11/919,333

(22) PCT Filed: Apr. 28, 2006

(86) PCT No.: PCT/JP2006/308987
§ 371 (c)(1),
(2), (4) Date: Oct. 26, 2007

(87) PCT Pub. No.: WO2006/134730
PCT Pub. Date: Dec. 21, 2006

(65) Prior Publication Data
US 2009/0304178 A1 Dec. 10, 2009

(30) Foreign Application Priority Data
Jun. 15, 2005 (JP) .................... 2005-175146

(51) Int. Cl.
*H04M 9/08* (2006.01)
(52) U.S. Cl. ............... 379/406.08; 379/406.14
(58) Field of Classification Search ...... 379/406.01–406.16; 381/66, 93.1, 381/94.3; 370/282–286; 455/570
See application file for complete search history.

(56) References Cited

U.S. PATENT DOCUMENTS

| 6,771,772 | B1 | 8/2004 | Tanrikulu |
| 6,868,158 | B2 * | 3/2005 | Takahashi et al. ....... 379/406.04 |
| 7,274,732 | B2 * | 9/2007 | Melsa et al. ................. 375/222 |
| 2004/0037417 | A1 * | 2/2004 | Seibert .................... 379/406.01 |

FOREIGN PATENT DOCUMENTS

| CN | 1402504 A | 3/2003 |
| JP | 08-251079 | 9/1996 |
| JP | 2003-134005 | 5/2003 |
| WO | WO-01/05053 A1 | 1/2001 |

* cited by examiner

*Primary Examiner* — Md S Elahee
*Assistant Examiner* — Akelaw Teshale
(74) *Attorney, Agent, or Firm* — Rabin & Berdo, P.C.

(57) ABSTRACT

An echo canceller, in which an adder adds a pseudo echo generated by an adaptive filter to an echo, so that the echo and the pseudo echo are canceled to each other, includes: a subband filter (8, 14) and a sampling converter (9, 15) for downsampling an audio signal; a selector switch (10, 16) which appropriately switches between a side performing the downsampling and another side performing fullband echo cancellation; and a tap arrangement controller (19) which optimizes a tap arrangement by using coefficients which are updated using a downsampled signal by the adaptive filter (11), the tap arrangement controller outputting the optimized tap arrangement to the adaptive filter (11) at time of the fullband echo cancellation.

19 Claims, 20 Drawing Sheets

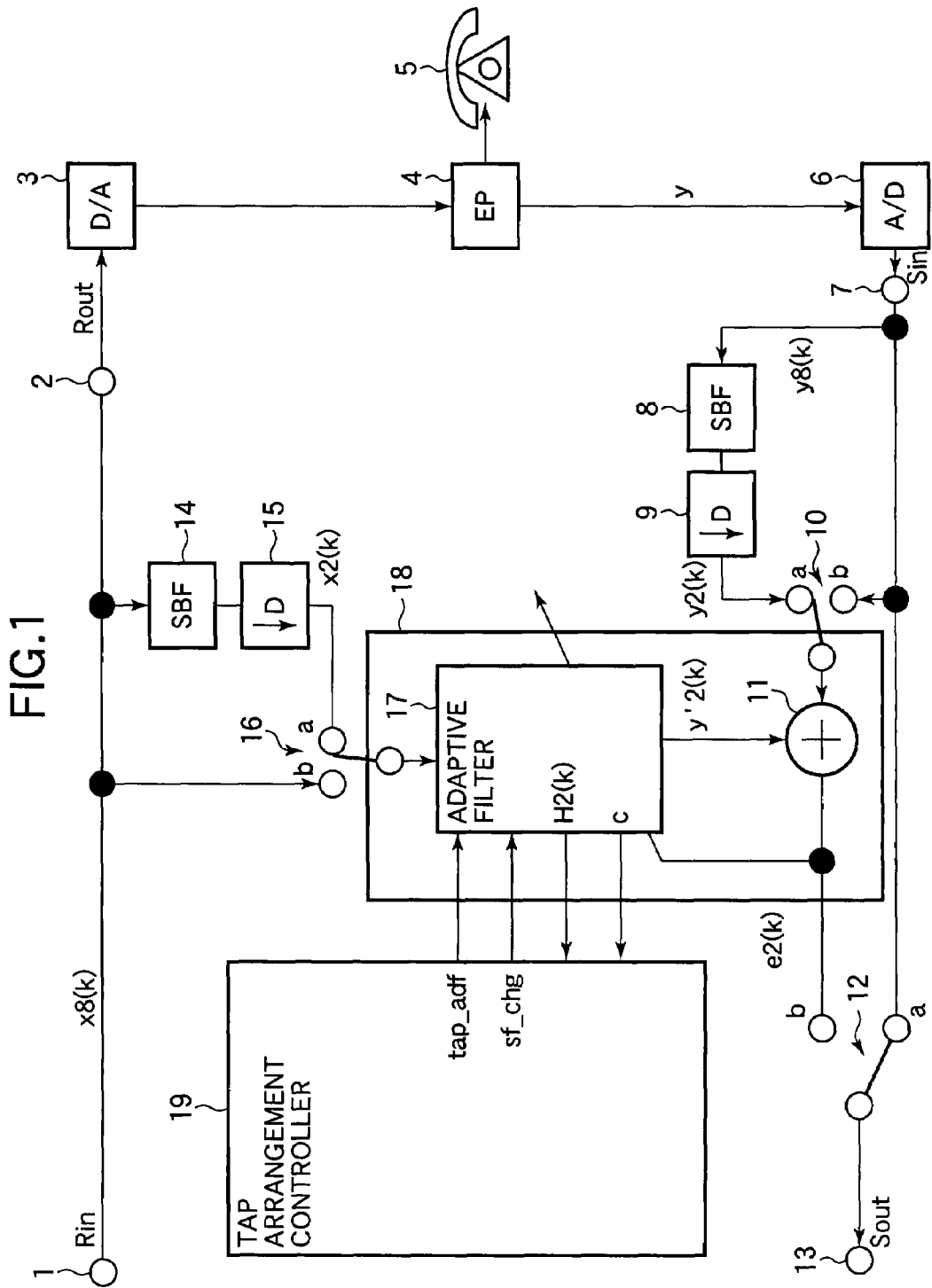

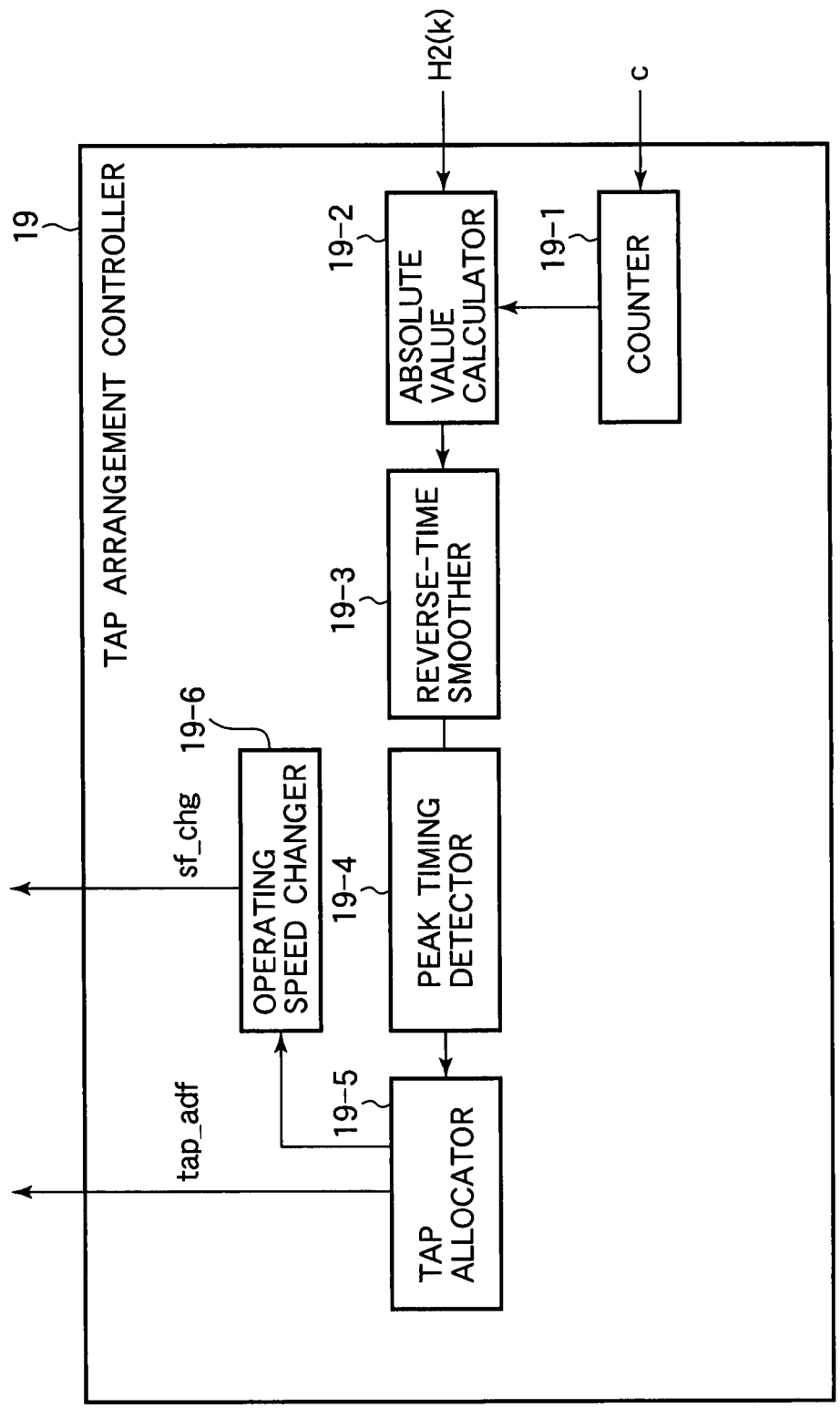

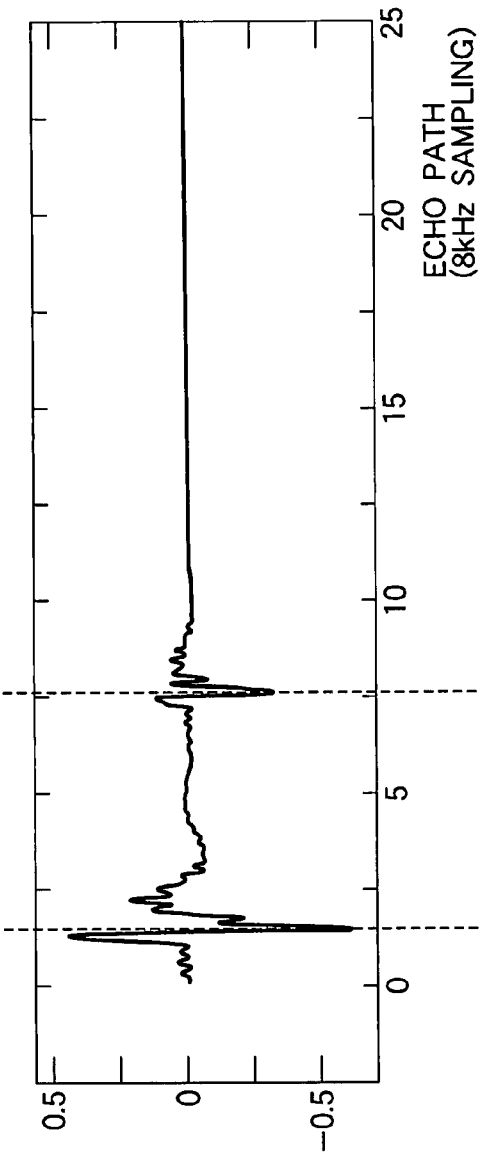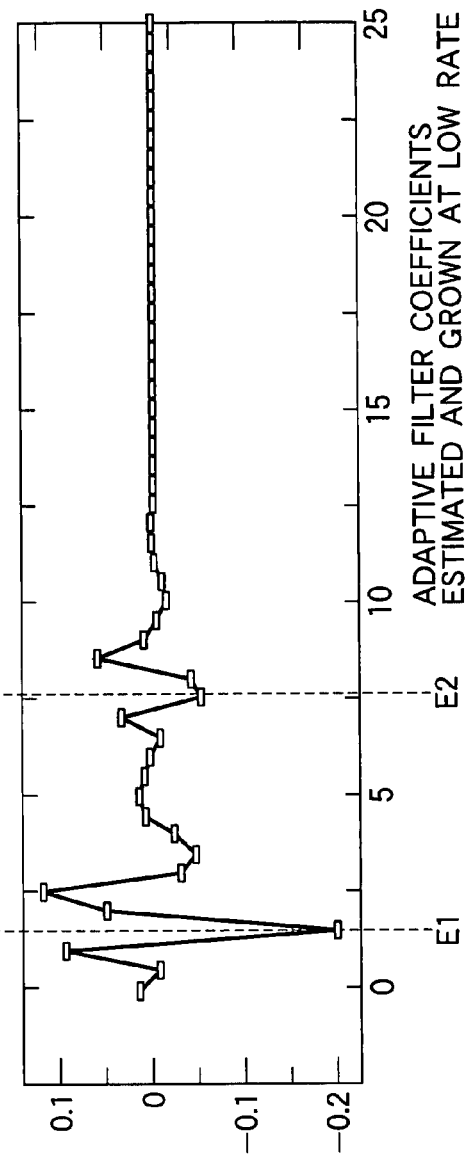

ECHO CANCELER

TECHNICAL FIELD

The present invention relates to an echo canceller.

BACKGROUND ART

An echo canceller improved so as to reduce amount of calculation when performing echo cancellation in a communication channel is disclosed, for example, in Japanese Patent Application Kokai (Laid-Open) Publication No. 2003-134005 (Patent Document 1).

In this echo canceller, an input signal from a communication channel is divided into subbands by a decimator and a subband filter. A position where an echo in the subband arises is detected by an echo position detector and a peak detector, and the detection signal is used for controlling the echo canceller.

By the above-mentioned control, the echo canceller is controlled with very small amount of calculation.

DISCLOSURE OF THE INVENTION

Problem to be Solved by the Invention

However, the conventional art described above has the following problems.
(1) In the conventional art, it is difficult to prevent performance degradation in the double talk. In the conventional art, the double talk is judged by detecting disturbance of coefficients of a subband adaptive filter. In general, the subband adaptive filter operates at a sampling frequency which is lower than that of a fullband echo canceller. This means that the detection takes much time. For this reason, the coefficients of the subband adaptive filter are disturbed. Such disturbance in the coefficients of the subband adaptive filter consequently causes fully destruction of the coefficients of the adaptive filter in the fullband echo canceller. At this time, even if a double-talk detection signal is received from the double-talk detector in subband operation, performance degradation in the double talk is inevitable.
(2) Since the above conventional art does not mention a specific tap arrangement after a peak is determined by the subband adaptive filter, and it is difficult to realize the specific tap arrangement concretely. In a case of using simple tap assignment, a portion which is a real serious echo source may be missed from the tap assignment.
(3) Since the apparatus of the conventional art is equivalent to a combination of a fullband echo canceller and a low-sampling-rate echo canceller, the size of the apparatus increases.
(4) It is not considered in the conventional art that all high-capacity channels converge at the same time. This point is actually a disadvantage. In the conventional art, finite calculation resources such as a DSP having finite capacity of processing and a memory having finite memory capacity are relatively richly and dynamically assigned to only a currently-used channel in an early stage of convergence, and resources which are not used at the channel any longer are opened to echo cancellers of other channels. However, in fact, this is an impractical alternative in view of public nature of high-capacity communication. In VoIP communication which recently starts to become widespread, for example, if there is a big event, such a case often occurs that channel capacity in high-capacity VoIP reaches a limit due to telephone conversations, depending on network capacity design. Actually, such an apparatus performing backbone communication is not available for practical use as lacks technique for working without problem up to accommodation channel design limit even if all channels coincidentally operate. In view of this point, it is not rather preferable for an echo canceller that resources are dynamically assigned over channels. That is, resources for an echo canceller for each channel should be roughly fixed to each of the channels in advance and should be dynamically and efficiently assigned within the rough fixed range in a channel. In other words, regarding the number of taps in a fullband echo canceller, it is required that fixed resources (such as the number of taps) are roughly assigned to every channel, finite DSP resources such as tap arrangement (amount of processing and memory) are appropriately assigned before the fullband echo canceller starts converging operation, and the fullband echo canceller operates after the assignment is completed.

That is, in contrast to the conventional art, it is required that every channel should have an echo canceller while the size of the apparatus and amount of calculation can be minimized.

Means for Solving the Problems

The present invention is made to solve the above problems and the object of the present invention is to provide an echo canceller which efficiently assigns and uses limited DSP resources and can efficiently remove an echo even in a case of double talk.

For this purpose, the echo canceller of the present invention includes an adaptive filter and an adder, wherein the adder adds a pseudo echo generated by the adaptive filter to an echo, so that the echo and the pseudo echo are canceled to each other. The echo canceller further includes a subband filter and a sampling converter, for downsampling an audio signal; a selector switch which appropriately switches between a side performing the downsampling and a side performing fullband echo cancellation used as a fullband echo canceller portion; and a tap arrangement controller which optimizes a tap arrangement by using coefficients which are updated by the adaptive filter by using a downsampled signal, the downsampled signal being generated through the downsampling by the subband filter and the sampling converter, the tap arrangement controller outputting the optimized tap arrangement to the adaptive filter; wherein, when the adaptive filter receives the tap arrangement optimized and outputted by the tap arrangement controller, the selector switch selects the side performing the fullband echo cancellation, so that the adaptive filter is used for the fullband echo cancellation in accordance with the optimized tap arrangement.

Effects of the Invention

A single adaptive filter can be used for tap arrangement optimizing processing by operating the adaptive filter at a low rate and also can be used as a fullband echo canceller through the use of the optimized tap arrangement. Therefore, the present invention can reduce the size of the apparatus and the amount of the calculation.

The amount of the calculation can be decreased and echo cancellation can be effectively implemented with small DSP resources. As a result, the present invention can provide a communication apparatus with reduced echo and excellent audio quality.

Moreover, a portion which is a real serious echo source is not missed from the assignment, and therefore echo cancellation can be automatically and reliably implemented.

Furthermore, since there is no dynamic assignment among channels and no competition between DSP resources, an echo canceller can operate with stability even if all channels are in operation.

BRIEF DESCRIPTION OF THE DRAWINGS

FIG. 1 is a block diagram showing a communication terminal apparatus having an echo canceller according to the first embodiment of the present invention;

FIG. 2 is a block diagram showing a tap arrangement controller;

FIG. 3A is a graph showing an echo path at 8 kHz sampling, and FIG. 3B is a graph showing adaptive filter coefficients estimated and grown at a low rate;

DESCRIPTION OF THE REFERENCE SYMBOLS

1 receiving input terminal Rin; 2 receiving output terminal Rout; 3 digital-analog converter; 4 echo path; 5 receiving-side telephone; 6 analog-digital converter; 7 sending input terminal Sin; 8, 14 subband filter; 9, 15 sampling converter; 10, 12, 16 selector switch; 11 adder; 13 sending output terminal Sout; 17 adaptive filter; 18 echo canceller portion; 19 tap arrangement controller; 19-1 counter; 19-2 absolute value calculator; 19-3 reverse-time smoother; 19-4 peak timing detector; 19-5 tap allocator; 19-6 operating speed changer; 20 tap arrangement controller; 21 maximum peak detector; 22 tap allocator; 30 tap arrangement controller; 31 echo reduction amount controller; 32 tap allocator; 40 tap arrangement controller; 41 fullband-echo-canceller convergence detector; 50 tap arrangement controller; 51 fullband-echo-canceller convergence detector; 60 tap arrangement controller; 61 fullband-echo-canceller convergence detector.

BEST MODE FOR CARRYING OUT THE INVENTION

The present invention has been made in view of the above-mentioned points, and the object of the present invention is to realize an echo canceller efficiently assigning and using DSP resources having finite memory capacity and finite calculation capability, by arranging taps in an echo canceller appropriately and automatically, and to provide an echo canceller being capable of effectively canceling an echo even if double talk which is known to interfere operations of the echo canceller or the like occurs.

Embodiments of the present invention will be described below.

First Embodiment

The first embodiment of the present invention will be described below.

Figure 4:
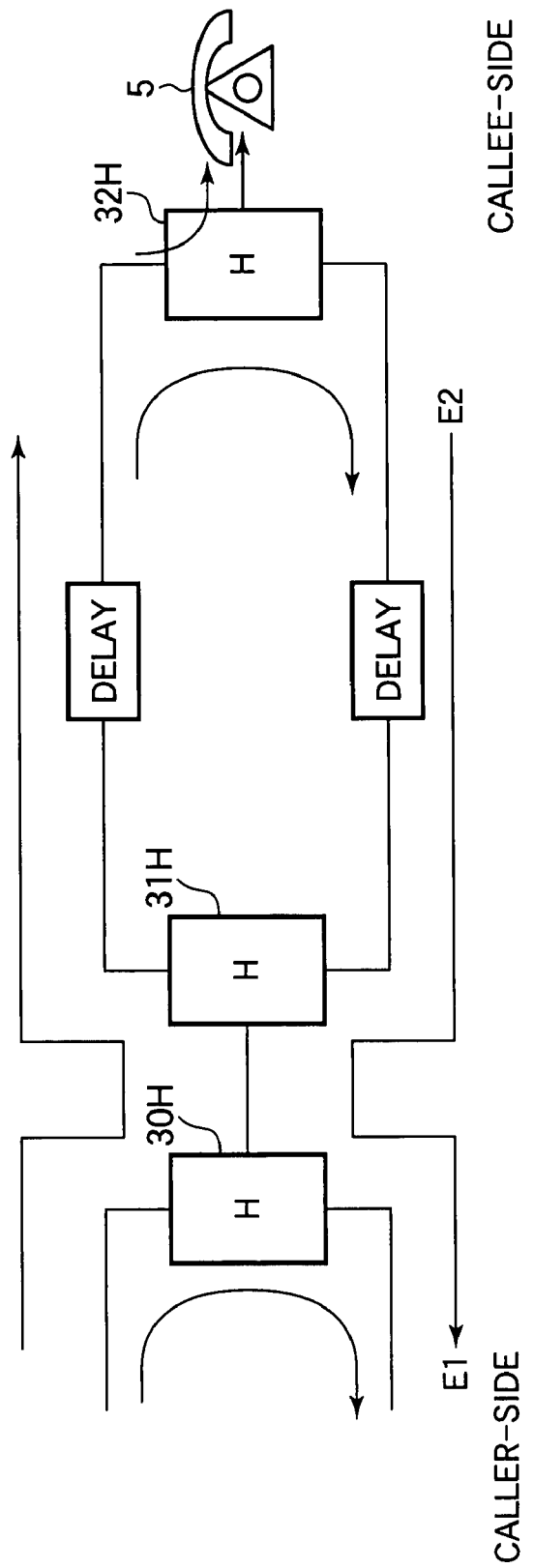
FIG. 4 is a conceptual diagram showing in what a case an echo path of FIG. 3A is generated.
Figure 5A:
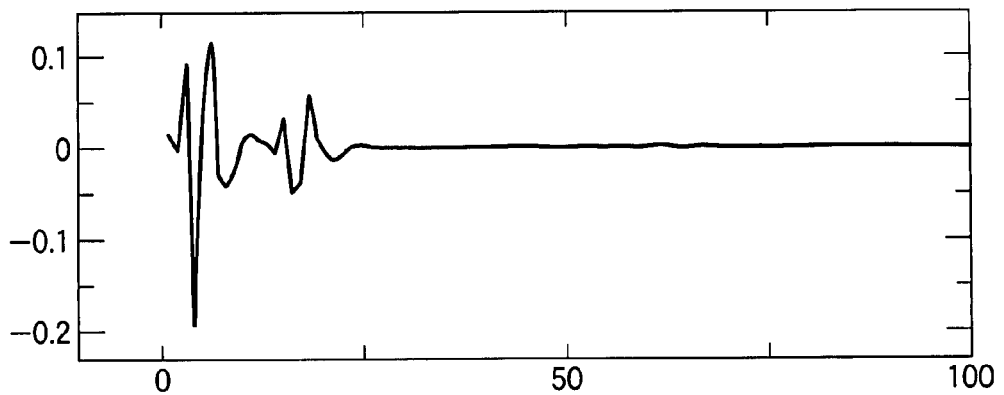
FIG. 5A is a graph showing coefficients H2(k) which are inputted to an absolute value calculator 19-2.
Figure 5B:
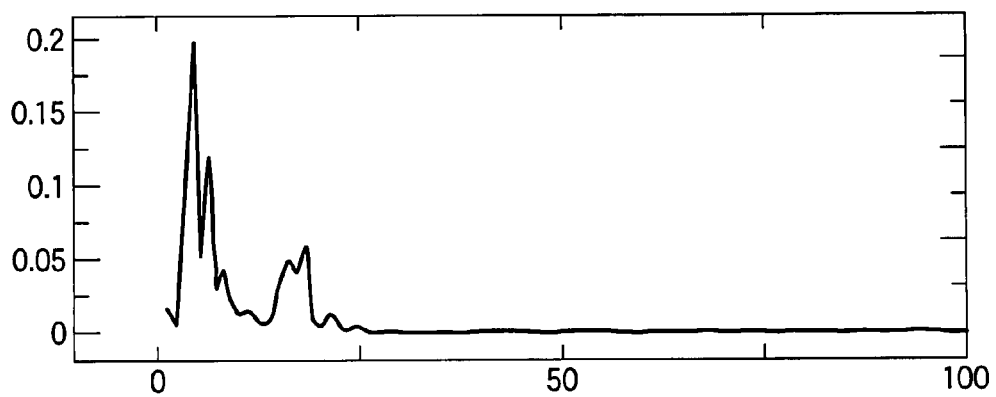
FIG. 5B is a graph showing absolute values of the coefficients H2(k) which are inputted to the absolute value calculator 19-2.
Figure 5C:
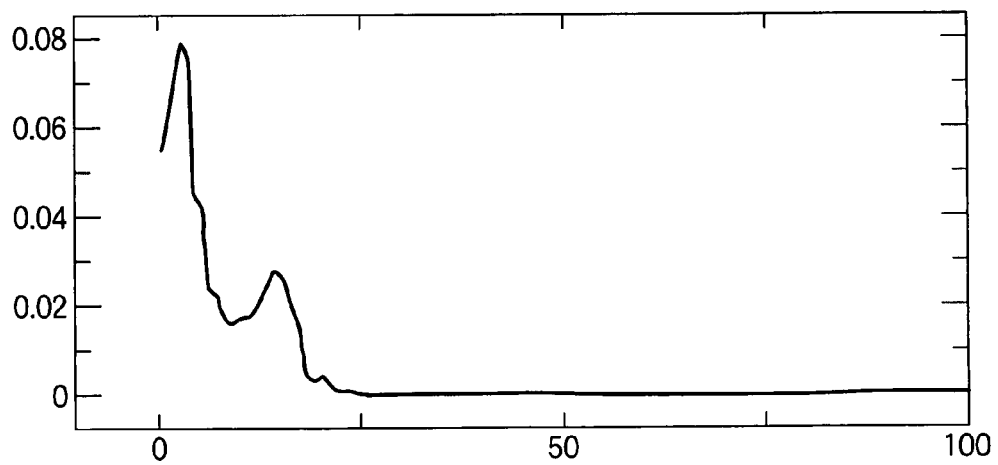
FIG. 5C is a graph showing a smoothed waveform of the absolute values of the coefficients H2(k) shown in FIG. 5B.
Figure 6:
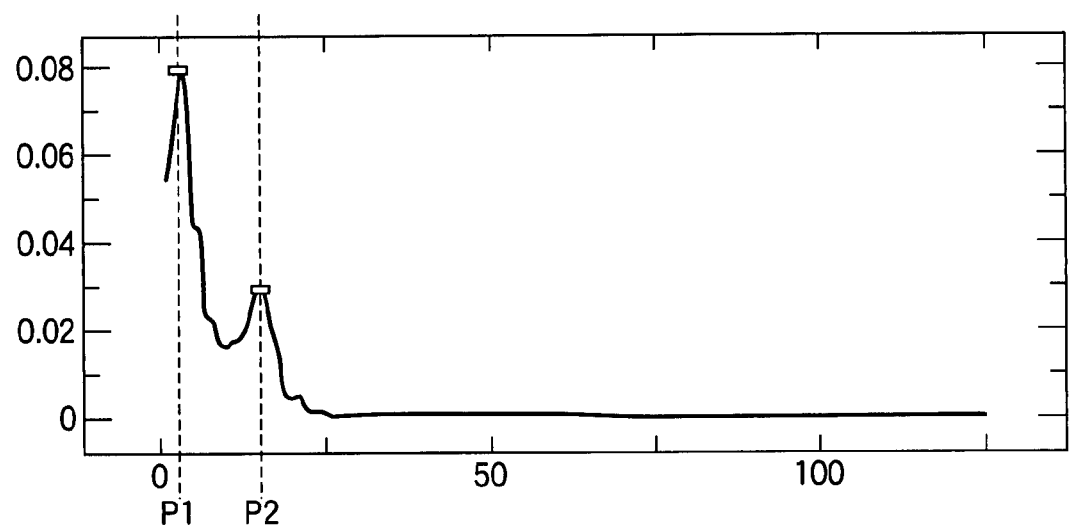
FIG. 6 is a graph indicating two peaks of the waveform of FIG. 5C by box-shaped points.

FIG. 1 is a block diagram showing a communication terminal apparatus having an echo canceller according to the first embodiment of the present invention, FIG. 2 is a block diagram showing a tap arrangement controller; FIG. 3A is a graph showing an echo path at 8 kHz sampling, FIG. 3B is a graph showing adaptive filter coefficients which are estimated and grown at a low rate, and FIG. 4 is a schematic diagram showing in what a case the echo path of FIG. 3A generates. FIG. 5A is a graph showing coefficients H2(k) which are inputted to an absolute value calculator 19-2, FIG. 5B is a graph showing absolute values of the coefficients H2(k) which are inputted to the absolute value calculator 19-2, FIG. 5C is a graph showing a smoothed waveform of the absolute values of the coefficients H2(k) of FIG. 5B, and FIG. 6 is a graph indicating two peaks of the waveform of FIG. 5C by box-shaped points.

A communication terminal apparatus having an echo canceller according to this embodiment is shown in FIG. 1. The communication terminal apparatus having an echo canceller according to this embodiment uses a single adaptive filter to detect an echo occurrence position in a downsampling state and performs echo cancellation in a fullband state. A configuration of the communication terminal apparatus having an echo canceller will be described below. Referring to FIG. 1, a reference numeral 1 denotes a receiving input terminal Rin (hereinafter simply referred to as "Rin"), and 2 denotes a receiving output terminal Rout (hereinafter simply referred to as "Rout"). Other reference numerals are as follows. A reference numeral 3 denotes a digital-analog converter (hereinafter simply referred to as "D/A"), 4 denotes an echo path, 5 denotes a receiving-side telephone, 6 denotes an analog-digital converter (hereinafter referred to as "A/D"), and 7 denotes a sending input terminal Sin (hereinafter simply referred to as "Sin"). Reference numerals 8 and 14 denote subband filters, 9 and 15 denote sampling converters, 10, 12 and 16 denote selector switches, 11 denotes an adder, 13 denotes a sending output terminal Sout (hereinafter simply referred to as "Sout"), 17 denotes an adaptive filter, 18 denotes an echo canceller portion, and 19 denotes a tap arrangement controller.

The subband filters 8, 14 and the sampling converters 9, 15 are devices for downsampling audio signals. The subband filters 8, 14 and the sampling converters 9, 15 are provided in parallel with a path from the Rin 1 to the adaptive filter 17 in the echo canceller portion 18 and with a path from the Sin 7 to the adder 11 in the echo canceller portion 18, respectively, and these devices and these paths make two courses. That is, the subband filter 14 and the sampling converter 15 are provided in parallel with the path for which an audio signal is inputted to the adaptive filter 17 from the Rin 1 and are switched by the selector switch 16 when necessary; on the other hand, the subband filter 8 and the sampling converter 9 are provided in parallel with the path for which an echo signal is inputted to the adder 11 from the Sin 7 and are switched by the selector switch 10 when necessary.

The subband filters 8, 14, the sampling converters 9, 15, the adaptive filter 17, the adder 11 and the tap arrangement controller 19 forms a downsampling processing means for downsampling an audio signal to obtain a downsampled audio signal, and updating the coefficients through the use of the downsampled audio signal to optimize a tap arrangement.

The echo canceller portion 18 is a device for canceling an echo in fullband. The echo canceller portion 18 includes, as its main constituent elements, the adaptive filter 17 and the adder 11, and is switched to connect to the Sout 13 by the selector switch 12 when necessary.

The adaptive filter 17 includes, as a component of the echo canceller portion 18, a component having a function of performing echo cancellation in fullband and a function of detecting an echo occurrence position from a downsampled audio signal and an echo signal. The functions of the adaptive filter 17 will be specifically described below.

The tap arrangement controller 19 is a device for detecting a peak of a coefficient curve to allocate tap coefficients of the adaptive filter 17 at time of fullband echo cancellation, switching sampling frequency, and controlling selections by the selector switches 10, 12 and 16. The tap arrangement controller 19 includes, as its main components, a counter 19-1, an absolute value calculator 19-2, a reverse-time smoother 19-3, a peak timing detector 19-4, a tap allocator 19-5, and an operating speed changer 19-6. Functions of these components will be described later.

Next, echo canceling operation in the communication terminal apparatus with an echo canceller having the above-mentioned configuration will be described.

Firstly, how an echo occurs will be described with reference to FIG. 1. In an initial state when a call is established, the selector switches are connected to terminals "a". The following explanation is on a precondition that a caller-side is on the left side in FIG. 1 and a callee-side is on the right side in FIG. 1.

At first, a call is established between a caller-side which is not shown in the drawing and a callee-side which is a side including the echo canceller portion 18 of FIG. 1. A caller-side audio signal is an audio signal which has been already digitized by an analog-digital converter which is not shown in the drawing. A signal inputted to the Rin 1 is inputted to the selector switch 16, the subband filter 14, and the Rout 2. An output signal from the Rout 2 to the D/A 3 is partly inputted to the callee-side telephone 5 and is partly reflected by the echo path 4 (a two-to-four wire converter not shown in the drawing) to be outputted as an analog echo signal y. This analog echo signal y is converted by the A/D 6 to a digital signal y8(k) which is inputted to the Sout 13 and is outputted as an echo signal to the caller-side speaker.

Next, the echo canceling operation in this embodiment will be described with reference to FIG. 1.

An echo signal from the Sin 7 is inputted to the selector switch 10 and the subband filter 8. An audio signal from the Rin 1 is inputted to the selector switch 16 and the subband filter 14. In this embodiment, a sampling frequency is 8 kHz. Here, it is assumed that the audio signal inputted to the Rin 1 is x8(k). A symbol "k" denotes number of an order. The subband filters 14 and 8 implement the downsampling described below by combination with the sampling converters 15 and 9. In an initial state, the selector switches 10, 12 and 16 are closed to the terminals "a" and a signal is outputted to a far-end speaker through the Sout 13.

The downsampling operation will be described below.

In this embodiment, the subband filter 14 is a low pass filter. A high-frequency-component cutoff frequency of the low pass filter is 1 kHz. In accordance with the sampling theorem, it is a publicly-known fact that a waveform of a signal can be completely described if the signal is sampled at a sampling frequency which is double the frequency component of the signal. Because a sampling frequency is just 2 kHz in a case that sampling is performed every four outputs of a 1-kHz cutoff filter (low pass filter) which is designed for 8 kHz, a waveform can be represented without an error. At this time, the sampling converter 15 outputs a 2-kHz sampling signal and this indicates that conversion with lowering a sampling speed is performed. On the other hand, the subband filter 8 and the sampling converter 9 function in the substantially same manner. Although each of the subband filters is explained as a 1-kHz cutoff-frequency low pass filter in this embodiment, the cutoff frequency is not limited to this example and can be set appropriately in accordance with various conditions if necessary. Frequency characteristics of each of the subband filters 14 and 8 may be a band elimination filter extracting a low-frequency component and it is not limited to a low pass filter.

An output from the sampling converter 15 is inputted to the adaptive filter 17, and an output from the sampling converter 9 is inputted to the adder 11 through the selector switch 10. An output from the adaptive filter 17 is also inputted to the adder 11. The output from the sampling converter 15 is represented by a symbol x2(k). With regard to k-th outputs of x2(k) and x8(k), x2(k) is a sampled train of four times longer time interval in comparison with x8(k). The output x2(k) from the sampling converter 15 is inputted to the adaptive filter 17, and on the other hand, the output y2(k) from the sampling converter 9 through the selector switch 10 is inputted to the adder 11. The relationship between the outputs y2(k) and y8(k) is the same as the relationship between the outputs x2(k) and x8(k) described above. The adder 11 adds it to the output y'2(k) from the adaptive filter 17, thereby calculating a residual signal e2(k) in accordance with the following equation (1).

$$e2(k) = y2(k) - y'2(k) \qquad (1).$$

The adaptive filter 17 is a publicly-known FIR digital filter and generates a pseudo echo in accordance with equation (2). Filter coefficients h2(i,k) are adaptively updated by a publicly-known "NLMS" algorithm in accordance with equation (3). Here, the symbol h2(i,k) indicates the i-th filter coefficient at the k-th sampling time.

$$y'2(k) = \sum_{i=0}^{M-1} h2(i,k) \times x2(k-i). \qquad (2)$$

A symbol "M" denotes number of taps in the adaptive filter 17. In this embodiment, the number of taps are 256. However, it is not limited to this number and another number is also available.

$$h2(i, k+1) = h2(i,k) + \alpha \frac{x2(k-i) \times e2(k)}{\sum_{i=0}^{M-1} x2(i)}. \qquad (3)$$

In equation (3), $\alpha$ is a constant for adjusting convergence speed of the adaptive filter 17 and ranges $0<\alpha<2$. If $\alpha$ is large, the adaptive filter 17 converges in a short time and is susceptible to an external disturbance such as a background noise. On the other hand, if $\alpha$ is small, the adaptive filter 17 converges in a long time and becomes insensitive to disturbance such as a background noise. In this embodiment, $\alpha=0.7$ is used, for example. However, $\alpha$ is not limited to this value and another value may be set as $\alpha$ in accordance with various conditions if necessary.

Every time the filter coefficients are updated through the use of the above-mentioned equations (1) to (3), the coefficients of the adaptive filter 17 grows by degrees and converges gradually as the coefficients are updated. In this embodiment, convergence is determined through the use of the number of times of the updating. That is, in order to determine growth degree of the coefficients of the adaptive filter 17, the tap arrangement controller 19 counts the number of updated times of the coefficients of the adaptive filter 17 at the counter 19-1 which will be described below, and determines whether convergence is reached in accordance with whether the counter 19-1 reaches a predetermined value. In this embodiment, a counted number of times obtained as a result of implementing equations (1) to (3) 400 times is regarded as completion of the convergence of the adaptive filter 17. Then, operation of the adaptive filter 17 is switched in the manner described below and a portion 18 starts operation as the fullband echo canceller.

Monitoring convergence of the adaptive filter 17 is not limited to using the counter 19-1 and any manner is available as long as completion of convergence of the adaptive filter 17 can be monitored and determined. A variation in coefficients values of the adaptive filter 17 themselves may be used as a key for monitoring the convergence.

Referring to FIG. 2 to FIG. 4, operation of the tap arrangement controller 19 will be described below.

The adaptive filter 17 outputs M coefficient values of the filter to the tap arrangement controller 19, where M is number of the coefficient values.

That is, the values expressed by equation (4) are outputted to the tap arrangement controller 19.

$$H2(k) = h2(i, L) \qquad (4),$$

L=400 (a predetermined count), and
i=0, 1, 2, . . . , M−1.

The adaptive filter 17 estimates an echo path through the use of a signal downsampled by the subband filters 14 and 8 and the sample converters 15 and 9. In consideration of operation interval of the adaptive filter 17, sampling points are delayed in a time axis in reference to sampling points based on an original sampling frequency of the fullband echo canceller portion 18 and it means that a longer time response can be addressed. That is, if the number of taps is the same, slower sampling allows to address a longer response length of the echo path 4. A 256-tap filter as in this embodiment covers only the length of 256/8000=32 ms at 8 kHz sampling frequency of the fullband echo canceller portion 18, and has the response length up to 128 ms which is four times longer at 2 kHz-sampling frequency. In this embodiment, as described below, a main echo occurrence position is detected at a long downsampled time-length, an updatable coefficients is accordingly arranged to only the detected echo occurrence position, a sampling frequency is switched to use the adaptive filter 17 as the fullband echo canceller portion 18. That is, the coefficients of the adaptive filter 17 operating at a low rate are analyzed as described below, as a result, tap allocation is performed to assign DSP calculation resources to the detected main echo occurrence position, thereby realizing the fullband echo canceller portion 18 by minimal processing amount. Although tap coefficients originally grow as coefficients obtained by estimating an echo path at 8 kHz, the tap coefficients expressed by equation (4) grow as coefficients obtained by estimating an echo path at 2 kHz, a lower sampling rate.

An echo path (8 kHz sampling) is shown in FIG. 3A. Adaptive filter coefficients which are estimated and grown at a low rate is shown in FIG. 3B. The horizontal coordinate represents time (ms). FIG. 4 is a conceptual diagram showing in what a case the echo path of FIG. 3A generates. Referring to FIG. 4, a caller-side signal is reflected at a first hybrid 30H near the caller-side; on the other hand, the signal flows through a second hybrid 31H and then through a four-wire network. At this time, network delay influences the signal. Then, the signal is reflected again at a third hybrid 32H in a callee-side, and an echo is generated and returns as a delayed echo. At this time, as examples shown in FIGS. 3A and 3B and FIG. 4, a response of the echo path 4 has a component around a point E1 (a 1.6 ms point in the drawing) and a point E2 (a 7.6 ms point in the drawing), and others may be almost always regarded as simple delays. However, it is essentially meaningless to allocate the adaptive filter coefficients of the adaptive filter 17 to such a delayed portion which has no echo component and to implement the updating of the coefficients in the fullband echo canceller portion 18. On the contrary, resources such as DSP power consumption, memory areas allocated to the coefficients, and calculation for updating coefficients are wasted. Thus, it is desirable to estimate an echo occurrence position and to allocate the tap coefficients effectively in the fullband echo canceller portion 18 in this embodiment.

Referring to FIG. 3 again, since the coefficients of the adaptive filter 17 in FIG. 3B are obtained at 2 kHz sampling, data as a sample exists only once in four times at 8 kHz sampling. In FIG. 3B, points in which data exist are represented by box-shaped points and a solid line connects between the box-shaped points. Although the adaptive filter 17 which calculates at a low rate can monitor for a longer time than a case of 8 kHz sampling as described above, both time-axes in FIGS. 3A and 3B are cut at the same point of time, for ease of understanding of these figures.

The explanation will continue with reference to FIG. 2, FIG. 5 and FIG. 6. When the counter 19-1 reaches a predetermined count and it is detected that the adaptive filter 17 once converged, the counter 19-1 accordingly outputs a counting termination signal to the absolute value calculator 19-2.

The absolute value calculator 19-2 receives a set of coefficients H2(k) estimated at a low rate from the adaptive filter 17. A state of H2(k) inputted to the absolute value calculator 19-2 is shown in FIG. 5A.

In FIGS. 5A to 5C, however, a horizontal coordinate does not represent time but represents an order of taps of the low-rate adaptive filter 17, while a vertical coordinate represents the amplitude of coefficient values, in order to simplify the explanation. The coefficients are illustrated up to 100 taps for ease of understanding in the following explanation. The relationship between time and the order of taps is that 1/2000 seconds=0.5 ms of time elapses every 1-tap shift to the right and the elapse of time is represented as waveform data transition in a direction from left to right. The right end of the waveform corresponds to the latest response of the echo path 4. Receiving the counting termination signal from the counter 19-1, the absolute value calculator 19-2 calculates the absolute values abs_h2(i,L) of the coefficients in accordance with equation (5).

$$abs\_h2(i,L)=abs(h2(i,L))\ (i=0,\ldots,M-1) \quad (5).$$

A state of abs_h2(i,L) is shown in FIG. 5B. The absolute values abs_h2(i,L) are inputted to the reverse-time smoother 19-3.

The reverse-time smoother 19-3 smoothes abs_h2(i,L) in reverse chronological order (in a reverse-time direction) in accordance with equation (6) and calculates lpo_h2(i,L). In this calculation, "i" is changed step-by-step from M−2 toward 0. That is, stored values abs_h2(i,L) are sequentially smoothed in reverse chronological order of stored past samples.

$$lpo\_h2(i,L)=\delta \times abs\_h2(i,L)+(1.0-\delta) \times lpo\_h2(i+1,L)$$
$$(i=M-2,M-3,\ldots,0) \quad (6).$$

The final point lpo_h2(M−1,L) is expressed as follows:

$$lpo\_h2(M-1,L)=\delta 2 \times abs\_h2(i,L) \quad (7).$$

δ is a constant representing a degree of smoothing and ranges 0<δ≦1. If δ is small, a noise which is a small vibration contained in estimated coefficients has little effect and variation in the coefficients is roughly represented. On the other hand, if δ is large, a noise has a large effect but very small variation in the coefficients can be represented.

In the present invention, δ=0.2. δ2 is a constant used for processing of an endpoint in equation (6) and ranges 0<δ2≦1. In this embodiment, δ2=1.0. A specific value of δ2 is not limited to this example and can be arbitrarily set by a designer depending on how much coefficient of the last tap of the order of the adaptive filter 17 is weighted.

It has a special meaning that the reverse-time smoother 19-3 repeats the smoothing calculations using a value selected one by one from M−2 to 0 in this order as the value i, that is, the reverse-time smoother 19-3 smoothes a waveform in sequence toward the past samples. A physical property is utilized here that a characteristic of the echo path 4 per a hybrid is initially greater and gradually attenuates as a lapse of time. Smoothing in accordance with equations (6) and (7) has a characteristic to "follow behind" an actual amplitude variation in abs_h2(i,L). In accordance with Equations (6) and (7), when a waveform is sequentially smoothed toward the past samples, a waveform peak in a waveform of lpo_h2(i,L) always appears behind in the traveling direction. That is, when the calculation is performed in the reverse time direction, it is detected slightly in advance of an actual peak of abs_h2(i,L) in the time axis. The below described tap allocator 19-5 utilizes this characteristic. A state of lpo_h2(i,L) is shown in FIG. 5C. The reverse-time smoother 19-3 outputs lpo_h2(i,L) to the peak timing detector 19-4.

The peak timing detector 19-4 detects a peak of a coefficient curve, now starting from i=1 toward i=M−2 as described below.

A peak is detected by using lpo_h2(i−1,L), lpo_h2(i,L), and lpo_h2(i+1,L), and a value hsf2_lp2_lpo[i] obtained when the following Condition 1 is satisfied is detected as a peak.

$$dif\_befor=hsf2\_lpo[i]-hsf2\_lpo[i-1] \quad (8).$$

$$dif\_after=hsf2\_lpo[i+1]-hsf2\_lpo[i] \quad (9).$$

Condition 1:

$$(dif\_befor \geqq 0.0)\ and\ (dif\_after<0.0) \quad (10).$$

When detecting a peak or peaks, the peak timing detector 19-4 outputs the detected peak as a potential peak up to a predetermined number (two in this embodiment) in decreasing order of peak amplitude to the tap allocator 19-5.

Further, in this embodiment, in preparation for some rare cases that an endpoint hsf2_lpo[0] becomes the maximum, it is predetermined that hsf2_lpo[0]=0.0. However, the present invention is not limited to this example. Since an endpoint hsf2_lpo[M−1] is not the maximum in normal cases, there is no need to consider processing at this endpoint hsf2_lpo particularly.

Although the number of the detected peaks is two or less in this embodiment, the number is not limited to this example. Two peaks detected in accordance with equation (10) are represented by box-shaped points in FIG. 6. A characteristic curve of lpo_h2(i,L) is also shown in FIG. 6.

In FIG. 6, a detection starting point is the origin and two points P1 and P2 are detected. The peak timing detector 19-4 outputs detected peak timing to the tap allocator 19-5. The tap allocator 19-5 allocates tap coefficients of the adaptive filter 17 in the fullband echo canceller portion 18 within a limited number for each channel (e.g., 256 taps) as described below. As will be described below, in this embodiment, the assignable adaptive filter coefficients are allocated to the detected peak timing. As has been described above, the number of taps in the adaptive filter 17, i.e., the number of updatable taps in the adaptive filter 17 is fixed in advance. In this embodiment, the number of taps in the adaptive filter 17 is fixed to 256 taps per every channel and the fixed 256 taps cover 128 ms of time length at 2 kHz sampling. The time length 128 ms at 8 kHz sampling is equivalent to the length of 1024 taps. As has been described above, however, most of them are considered to be forward delay components and only a part of them may be an echo source. The tap allocator 19-5 selectively allocates the filter coefficients of the adaptive filter 17 selected from among the filter coefficients of 1024 samples, for example, and allocates forward delay to the rest as a substitute for the filter coefficients. The tap allocator 19-5 decides the peak timing P1 and P2 inputted from the peak timing detector 19-4 to be starting points of the coefficient taps of the adaptive filter 17. As a result of setting such starting points, as the operation of the reverse-time smoother 19-3 described above, the maximum peak position which exists subsequently to the points P1 and P2 of the real echo path 4 is always contained.

Thus, in this embodiment, N=256/2=128 taps, that is, a half of 256 taps of the coefficients is allocated from an assignment starting point P1 and the other half allocated from another assignment starting point P2, and forward delay is allocated to the rest. Although the points P1 and P2 themselves are used as reference points for assignment here, a margin may be additionally provided in a reverse time direction if necessary. In this case, even if the adaptive filter 17 is operated at 8 kHz, the updating of the coefficients is still performed for 256 taps. In FIG. 6, P1=3 and P2=15, which are "sample positions at 2 kHz sampling". Also, the sample position starts from zero in this embodiment. That is, sample timing at 8 kHz sampling agrees with sample timing in a case of its four times number of samples. Accordingly, in the fullband echo canceller portion 18 operating at 8 kHz sampling, the P1'-th tap of the coefficients (the 12th tap, i.e., a point of time of 1.5 ms) of the adaptive filter 17 is assigned to P1 and the 60th tap (i.e., a point of time of 7.5 ms) is assigned to P2' as coefficients allocation starting points in the adaptive filter 17. The tap allocator 19-5 thereby implements assignment as follows. Both of P1' and P2' take on values:

$$Pn' = Pn \times \frac{\text{fullband echo canceller portion 18}}{\text{low rate sampling frequency}}$$

$(n = 1, 2)$.

The first group: assigned to the 12-th to the 139-th sample positions.
The second group: assigned to the 60-th to the 187-th sample positions.
(Corresponding to 8 kHz Sampling)

Ordinarily, it is acceptable that a half of 256 taps is assigned to positions determined from one of the peaks and the other half of 256 taps is assigned to the other positions determined from the other peak. In the echo path 4 in this embodiment, however, the adaptive filters 17 at the 60-th to the 139-th sample positions overlap in the first group and the second group. In such a case, it can be satisfied with further less tap coefficients and 174 taps are assigned and forward delays are assigned to the rest.

When completing the assignment of the tap coefficients in the adaptive filter 17, the tap allocator 19-5 outputs a sampling speed changing signal sf_chg to the operating speed changer 19-6 and outputs the assigned tap coefficients tap_adf to the adaptive filter 17. In this embodiment, tap coefficients tap_adf (assigned to the 60-th to the 139-th sample positions) are outputted to the adaptive filter 17.

The operating speed changer 19-6 switches the sampling frequency to 8 kHz and causes the selector switches 10, 12 and 16 to connect terminals "b". Accordingly, the adaptive filter 17 operates as the fullband echo canceller portion 18 at a sampling frequency of 8 kHz, as follows.

$$e8(k) = y8(k) - y'8(k) \tag{1}'$$

The adaptive filter 17 is a publicly-known FIR digital filter.

A pseudo echo is reduced in accordance with equation (1)' and the filter coefficients are updated in accordance with the publicly-known "NLMS" algorithm through the adaptive use of equations (2)' and (3)'. Here, h8(i,k) indicates the i-th filter coefficient at the k-th sampling time.

$$y'8(k) = \sum_{i=12}^{187} h8(i,k) \times x8(k-i). \tag{2}'$$

$$h8(i, k+1) = h8(i,k) + \alpha \frac{x8(k-i) \times e8(k)}{\sum_{i=12}^{187} x8(i)}. \tag{3}'$$

$i = 12$ to $187$.

If tap assignment can be completely divided into a portion of P1 and another portion of P2, the equations (2)' and (3)' yield the following equations (4)', (5-a)', and (5-b)'.

$$y'8(k) = \sum_{i=P1}^{P1+127} h8(i,k) \times x8(k-i) + \sum_{i=P2}^{P2+127} h8(i,k) \times x8(k-i). \tag{4}'$$

$$h8(i, k+1) = h8(i,k) + \alpha \frac{x8(k-i) \times e8(k)}{\sum_{i=P1}^{P1+127} x8(i)}. \tag{5-a}'$$

$i = P1$ to $(P1 + 127)$.

$$h8(i, k+1) = h8(i,k) + \alpha \frac{x8(k-i) \times e8(k)}{\sum_{i=P2}^{P2+127} x8(i)}. \tag{5-b}'$$

$i = P2$ to $(P2 + 127)$.

Accordingly, in the fullband echo canceller portion 18 which is composed of the adaptive filter 17 and the adder 11, only an echo portion is covered by the adaptive filter 17 at 8 kHz sampling, and the rest is covered by forward delay coefficients. Therefore, it is possible to reduce an echo effectively by the adder 11 and to output a signal from which the echo is reduced through the selector switch 12 to the Sout 13.

Thus, according to the first embodiment, the following effects can be obtained.

By downsampling an audio signal to obtain a downsampled signal, updating the tap coefficients through the use of the downsampled signal by the adaptive filter 17, and optimizing the tap arrangement by the tap arrangement controller 19 to allocate the tap coefficients to the adaptive filter 17, the single adaptive filter 17 can be operated at a low rate to be used for tap arrangement optimizing processing, and can be used as the fullband echo canceller portion 18 just as it is through the use of the optimized tap arrangement. Therefore, the size of the apparatus and the amount of calculation can be decreased.

There is no dynamic allocation among channels, a sampling frequency is switched to an original sampling frequency by the operating speed changer 19-6 after coefficients allocation, the tap allocator 19-5 allocates the coefficients (which are sequentially updated) only for a necessary portion to the adaptive filter 17 in such a manner to avoid downsampling processing by switching the selector switches 10 and 16 and allocates a simple delay obtained without calculation to the rest. Therefore, echo cancellation can be efficiently implemented with reduced amount of calculation and with small DSP resources. As a result, a communication apparatus which reduces an echo and realizes excellent audio quality can be provided. Moreover, DSP resources can be utilized in another function with the current DSP resources and with required echo canceling function maintained.

Furthermore, since the reverse-time smoother 19-3 smoothes the absolute values of the coefficients of the adaptive filter 17 in a reverse time direction toward the past, a peak of the real echo path 4 can be certainly identified. In other words, on the basis of peak timing detected by the peak timing detector 19-4, the tap allocator 19-5 can cause a peak of the real echo path 4 to be certainly included in a range covered by the adaptive filter 17 in the fullband echo canceller portion 18. As a result, a portion which is a real serious echo source is not missed from allocation and thereby echo cancellation can be automatically and reliably implemented.

Since there is no dynamic allocation among channels and there is no DSP resource competition, the fullband echo canceller portion 18 can be operated with stability even if all channels operate.

In order to reduce echo feeling during the tap position estimation by the tap arrangement controller 19, an attenuator may be provided between a block including the adder 11 and the adaptive filter 17, and the selector switch 12, that is, on a side of the Sout 13 of the block including the adder 11 and the adaptive filter 17.

Also, in order to eliminate echo feeling completely during the tap position estimation, the selector switch 12 may be opened (a state being contact with neither the terminals "a" nor "b" of the selector switch 12) during the tap position estimation.

Second Embodiment

The second embodiment of the present invention will be described below.

Figure 7:
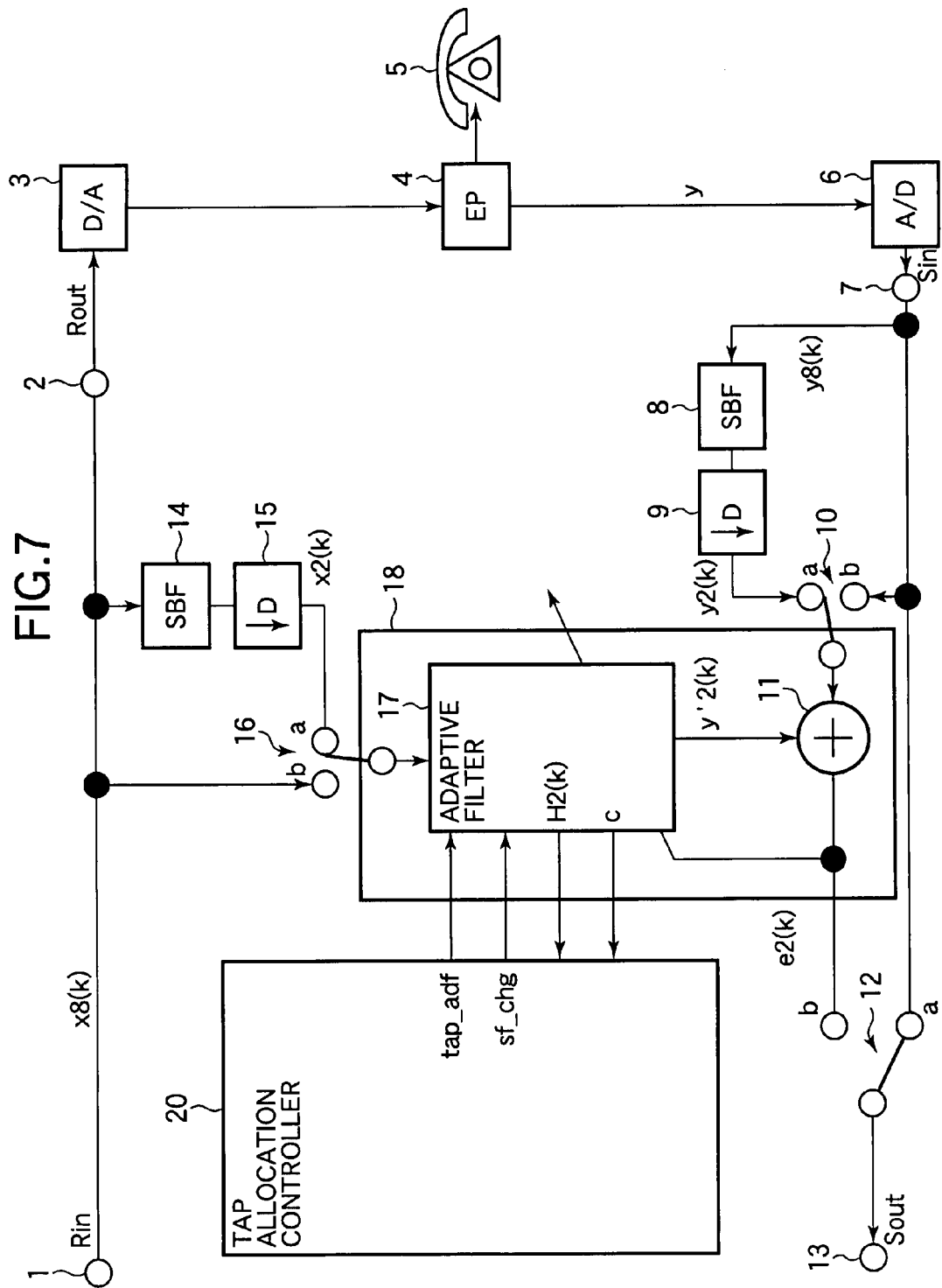
FIG. 7 is a block diagram showing a communication terminal apparatus having an echo canceller according to the second embodiment of the present invention.
Figure 8:
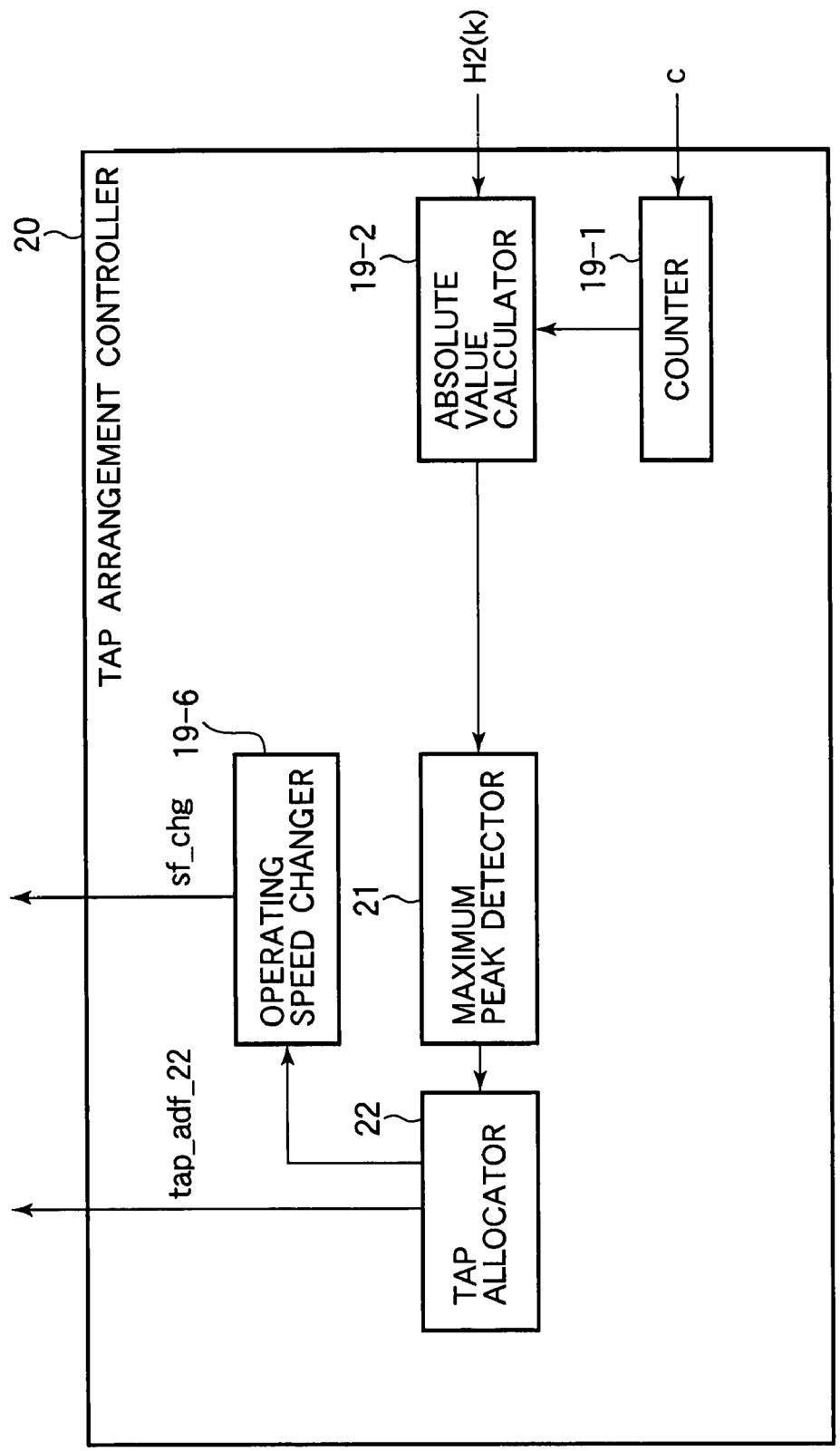
FIG. 8 is a block diagram showing a tap arrangement controller.
Figure 9A:
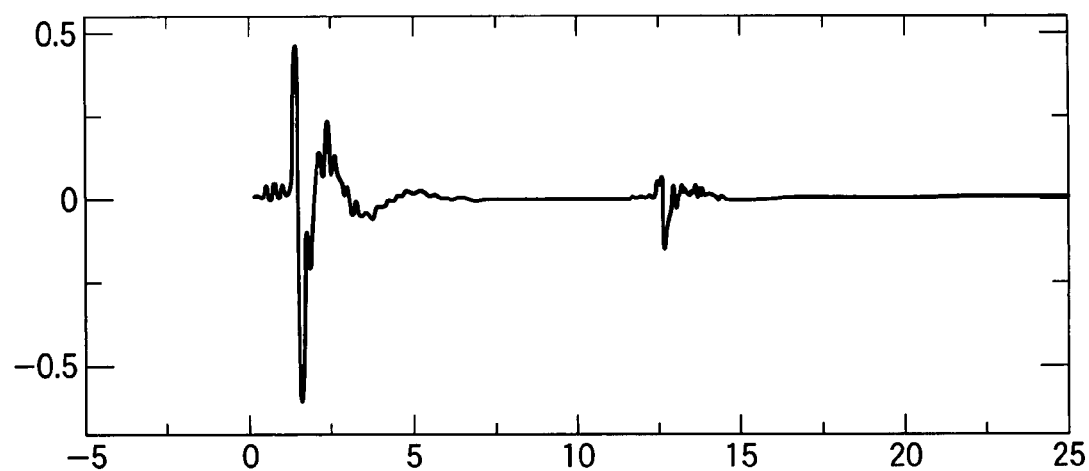
FIG. 9A is a graph showing an echo path at 8 kHz sampling.
Figure 9B:
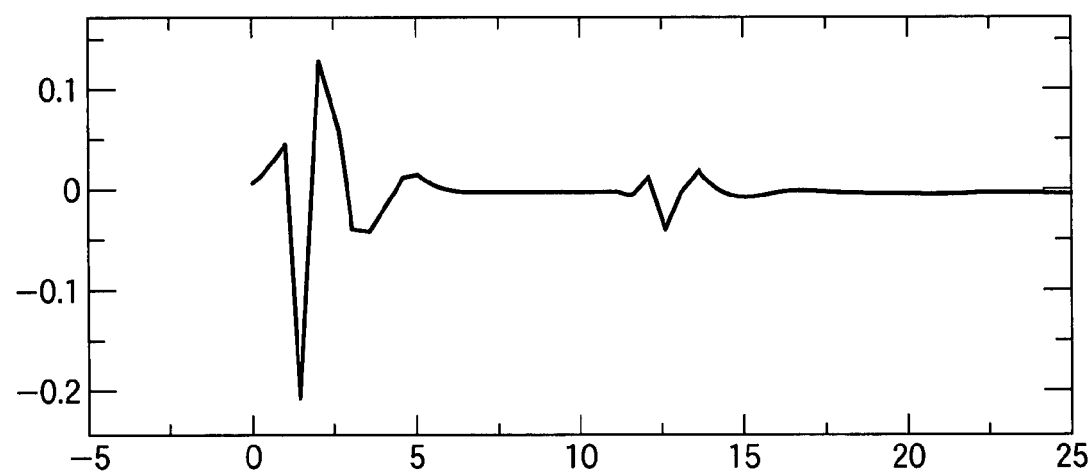
FIG. 9B is a graph showing adaptive filter coefficients estimated and grown at a low rate.
Figure 10A:
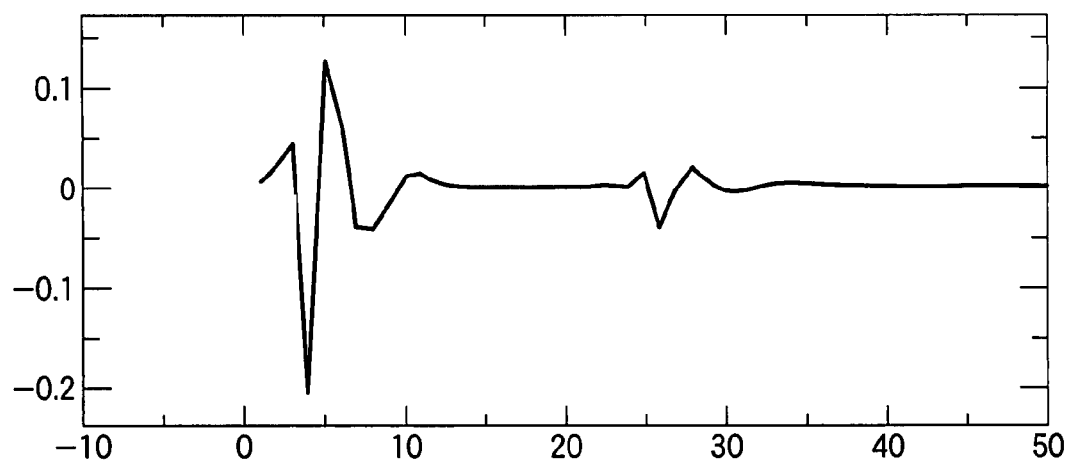
FIG. 10A is a graph showing the adaptive filter coefficients of FIG. 9B wherein a horizontal coordinate represents samples.
Figure 10B:
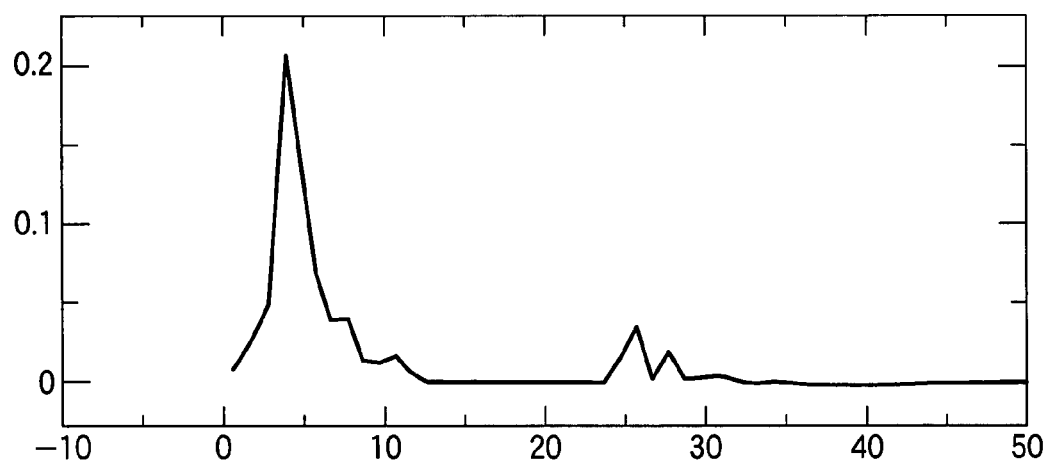
FIG. 10B is a graph showing absolute values of the coefficients H2(k) which are inputted to an absolute value calculator.
Figure 11A:
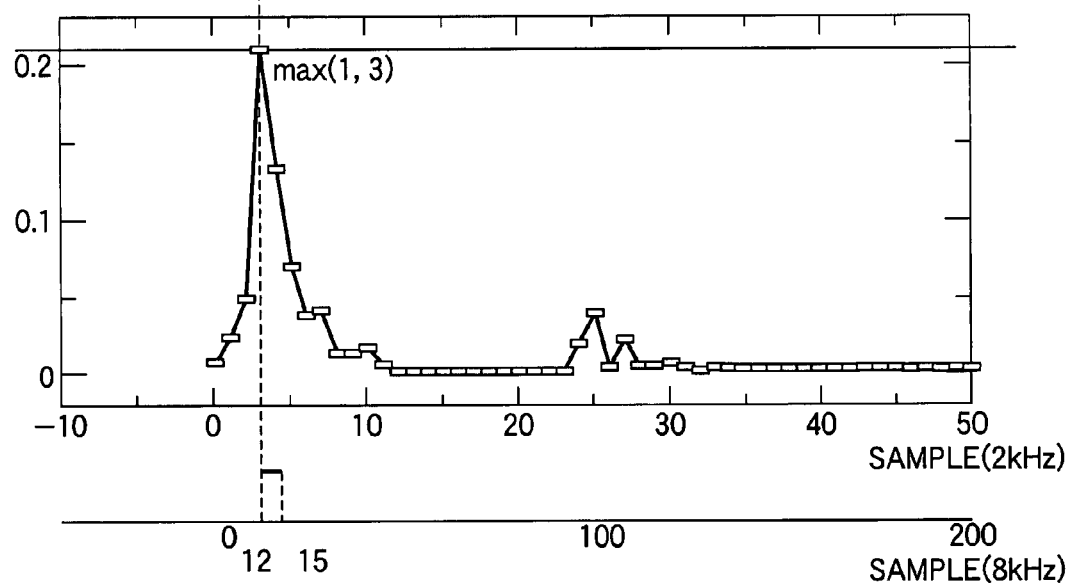
FIG. 11A is a graph showing a state when a maximum peak detector 21 detects a maximum value portion.
Figure 11B:
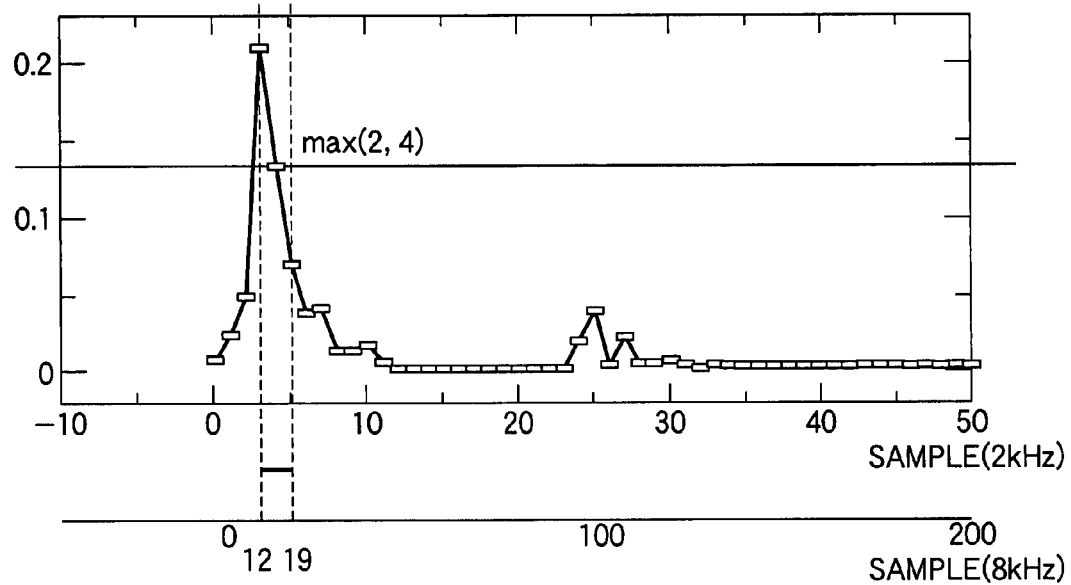
FIG. 11B is a graph showing a state when coefficients of the adaptive filter are allocated in the second time assignment.

FIG. 7 is a block diagram showing a communication terminal apparatus having an echo canceller according to the second embodiment of the present invention, FIG. 8 is a block diagram showing a tap arrangement controller, FIG. 9A is a graph showing an echo path at 8 kHz sampling, and FIG. 9B is a graph showing the adaptive filter coefficients estimated and grown at a low rate. FIG. 10A is a graph showing the adaptive filter coefficients of FIG. 9B, wherein a horizontal coordinate represents samples, and FIG. 10B is a graph showing absolute values of the coefficients H2(k) inputted to an absolute value calculator. FIG. 11A is a graph showing a state in which a maximum value portion is detected by the maximum peak detector 21, and FIG. 11B is a graph showing a state in which the second assignment is performed as allocation of the adaptive filter coefficients.

The communication terminal apparatus having an echo canceller according to the second embodiment is shown in FIG. 7 and FIG. 8. The second embodiment is different from the first embodiment in a respect that the tap arrangement controller 19 is replaced by a tap arrangement controller 20. The tap arrangement controller 20 in the second embodiment is different from the tap arrangement controller in the first embodiment in respects that the reverse-time smoother 19-3 is removed and that the peak timing detector 19-4 is replaced by the maximum peak detector 21 and the function of the tap allocator 19-5 changes in some degree as a result of the replacement. Except for the above-mentioned respects, the second embodiment is substantially the same as the first embodiment. Therefore, the same description is omitted here, and only the operation of the tap arrangement controller 20 will be described below.

In the first embodiment, the tap arrangement in the fullband echo canceller portion 18 is determined from a temporal timing position of a peak of an echo path. However, in the second embodiment, the taps of the fullband echo canceller portion 18 are intensively assigned to a portion in which a large echo that influences communication quality occurs, to effectively remove the echo.

The second embodiment will be specifically described below with reference to the attached drawings.

Occurrence of the echo has been already described with reference to FIG. 4. In general, since the delays occur in the echo path as shown in FIG. 4, two hybrids 30H and 32H often look like separated. In actual, however, a signal on a transmission line is commonly influenced by not only the delay but also attenuation on the transmission line. For this reason, in a typical network, an echo which occurs at the hybrid 32H being the closest to a callee-side and returns to a caller-side has larger delay and smaller amplitude in comparison with an echo which occurs at the hybrid 30H being close to the caller-side and returns to the caller-side. This is shown in FIG. 9A. The horizontal coordinate represents time (ms) and the vertical coordinate represents amplitude. It indicates that the second peak is around 13 ms. When a signal has such an echo path waveform, the coefficients of the adaptive filter 17 operating at a low rate is as shown in FIG. 9B. Tap assignment in the adaptive filter 17 will be again described here in the similar manner to the first embodiment. For the explanation, the coefficients of the adaptive filter 17 of FIG. 9B is shown in FIG. 10A, wherein a horizontal coordinate represents samples. FIG. 10A shows samples up to the 50-th sample in the horizontal coordinate. At this time, the following output of the absolute value calculator 19-2 is as shown in FIG. 10B $$abs\_h2(i,L)=abs(h2(i,L)) \; (i=0, \ldots, M-1) \tag{5}$$

The maximum peak detector 21 determines abs_h2(i,L) in a decreasing order from the maximum abs_h2(i,L) to the (BLOCK_LIMIT)-th abs_h2(i,L) to output abs_h2(i,L) to the tap allocator 22.

The maximum peak detector 21 outputs information of Max(n,i) {n=1, . . . , BLOCK_LIMIT}, that is, information that the n-th largest abs_h(i,L) is the i-th abs_h(i,L) disposed at the i-th position, to the tap allocator 22.

BLOCK_LIMIT is a constant which depends on a thinning ratio. BLOCK_LIMIT is calculated in accordance with equation (11), where the number of taps determined in advance in the adaptive filter 17 in the fullband echo canceller portion 18 is represented as M, a sampling frequency is represented as LargF, and a sampling frequency for the adaptive filter 17 at a low rate is represented as SmalF.

$$\text{BLOCK\_LIMIT} = \frac{M}{(LargF/SmalF)}. \tag{11}$$

In this embodiment, a sampling frequency of the fullband echo canceller portion 18 when M=256 taps is 8 kHz, and a sampling frequency for the adaptive filter 17 at a low rate is 2 kHz. Therefore, the following equation is obtained:

BLOCK_LIMIT=256/{(8000/2000)}=64.

The maximum peak detector 21 evaluates the magnitudes of values of abs_h2(i,L) to obtain sixty-four values of max(n,i) including the maximum point orderly, i.e., values between max(1,i) and max(64,i) inclusive, and outputs the obtained values to the tap allocator 22.

The tap allocator 22 sequentially assigns the number of taps to the adaptive filter 17 in the fullband echo canceller portion 18, wherein the number of taps is W2 for a single max(x,i) expressed in an 8-kHz sampling frequency time axis:

$$W2=LargF/SmalF \text{ (4 in this embodiment)} \tag{12}.$$

This will be described with reference to FIGS. 10A and 10B and FIGS. 11A and 11B as below. When an output abs_h2(i,L) of the absolute value calculator 19-2 is as shown in FIG. 10B, the maximum peak detector 21 detects a maximum value portion of abs_h2(i,L) to output the detected maximum value portion as max(1,i) as shown in FIG. 11A. In the tap allocator 22, it is known that the i-th abs_h(i,L) disposed at the i-th position is the largest, that is, max(1,i), for example. Therefore, the tap allocator 22 calculates W2_LF (1,i), that is, the i-th tap of the fullband echo canceller portion 18.

$$W2\_LF(1,i)=h8(W2\times1,k)(i=1,\ldots,\text{BLOCK\_LIMIT}) \quad (13).$$

In equation (13), a maximum peak position is detected by the i-th coefficient of the low-rate adaptive filter. Thus, it indicates that the adaptive filter h8(W2×i,k) is assigned to the (W2×i)-th order of the fullband echo canceller portion 18. Since the maximum value portion is max(1,3) and i equals to 3 in FIG. 11A, in accordance with equation (13), h8(12,k) to h8(15,k) are allocated as the adaptive filter coefficients to the adaptive filter 17 in the fullband echo canceller portion 18, $$W2\_LF(1,3)=4\times3=12$$

that is, from the 12th tap as a starting point, as illustrated in FIG. 11A.

Next, the tap allocator 22 is detected at the second largest abs_h2(i,L)=max(2,x) (x=4 in this embodiment), and accordingly h8(16,k) to h8(19,k) are newly allocated as the coefficients of the adaptive filter 17 in the second assignment. At this stage, h8(12,k) to h8(19,k) are assigned to the adaptive filter 17 as shown in FIG. 11B. Thus, the tap coefficients of the adaptive filter 17 are sequentially assigned to max(i,x) (i=1, . . . , BLOCK_LIMIT).

In this embodiment, at the time that assignment of 64 values of max(64,x) is completed, all of 256 tap coefficients which are available for the adaptive filter 17 are assigned as the tap coefficients of the fullband echo canceller portion 18 and then the assignment is completed. All the tap coefficients to which no adaptive tap coefficients are assigned are forward delay tap coefficients.

In a case where the 256 taps for assignment are exhausted such as when a margin is added to assignment before the assignment of 64 values of max(64,x) is fully completed, the tap coefficients assignment terminates at the time and the forward delays are assigned to the rest of the taps.

When the assignment of the tap coefficients in the adaptive filter 17 is completed, the tap allocator 22 outputs a sampling speed changing signal sf_chg to the operating speed changer 19-6 and outputs assignment tap positions tap_adf_22 to the adaptive filter 17.

The fullband echo canceller portion 18 causes only a portion to which taps are allocated to operate as the adaptive filter 17 and causes the rest to operate as delays, in the similar manner to the first embodiment.

Although the description has been made as to an example that the taps of the adaptive filter 17 are roughly divided into two groups to be allocated in this embodiment, the number of divided groups is not limited to two. In this embodiment, the taps may be divided into any number of groups as long as the allocation is possible.

Although the number determined from equation (11) is used as a tap assignment number in this embodiment, it is not limited to this example. A redundant margin may be added to the number determined from equation (11) in order to prevent a gap in the coefficients allocation.

As has been described above, in the second embodiment, the taps of the adaptive filter 17 are selectively and sequentially assigned to a portion in which a large echo occurs, more precisely as compared with the first embodiment, and thus it can be realized to assign automatically the taps of the adaptive filter 17 in the fullband echo canceller portion to a portion in which echo degradation is seriously influenced on speech as compared with the first embodiment. Therefore, an echo can be cancelled more precisely and excellent communication quality without echo feeling can be realized as compared with the first embodiment.

Third Embodiment

The third embodiment of the present invention will be described below.

Figure 12:
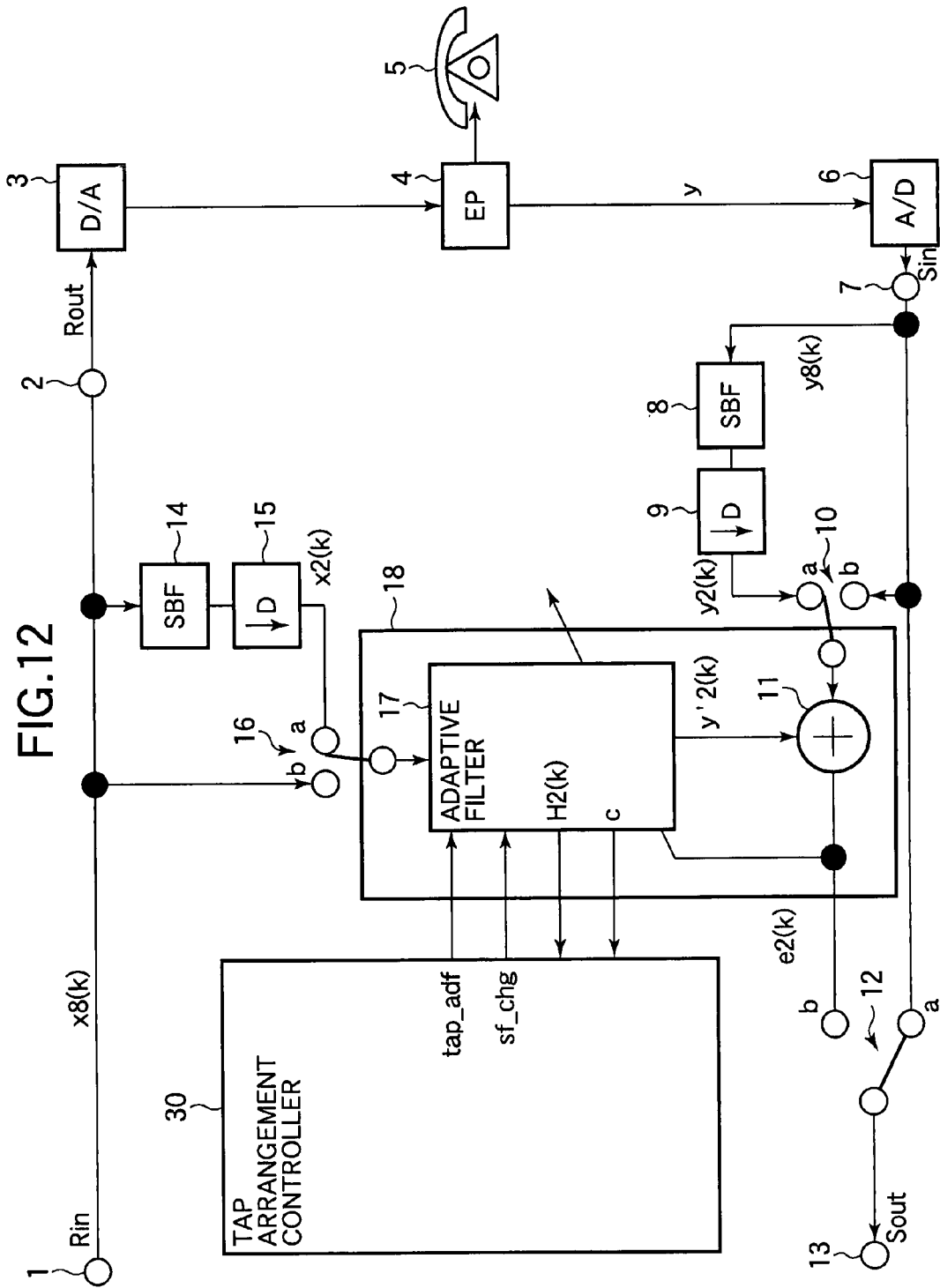
FIG. 12 is a block diagram showing a communication terminal apparatus having an echo canceller according to the third embodiment of the present invention.
Figure 13:
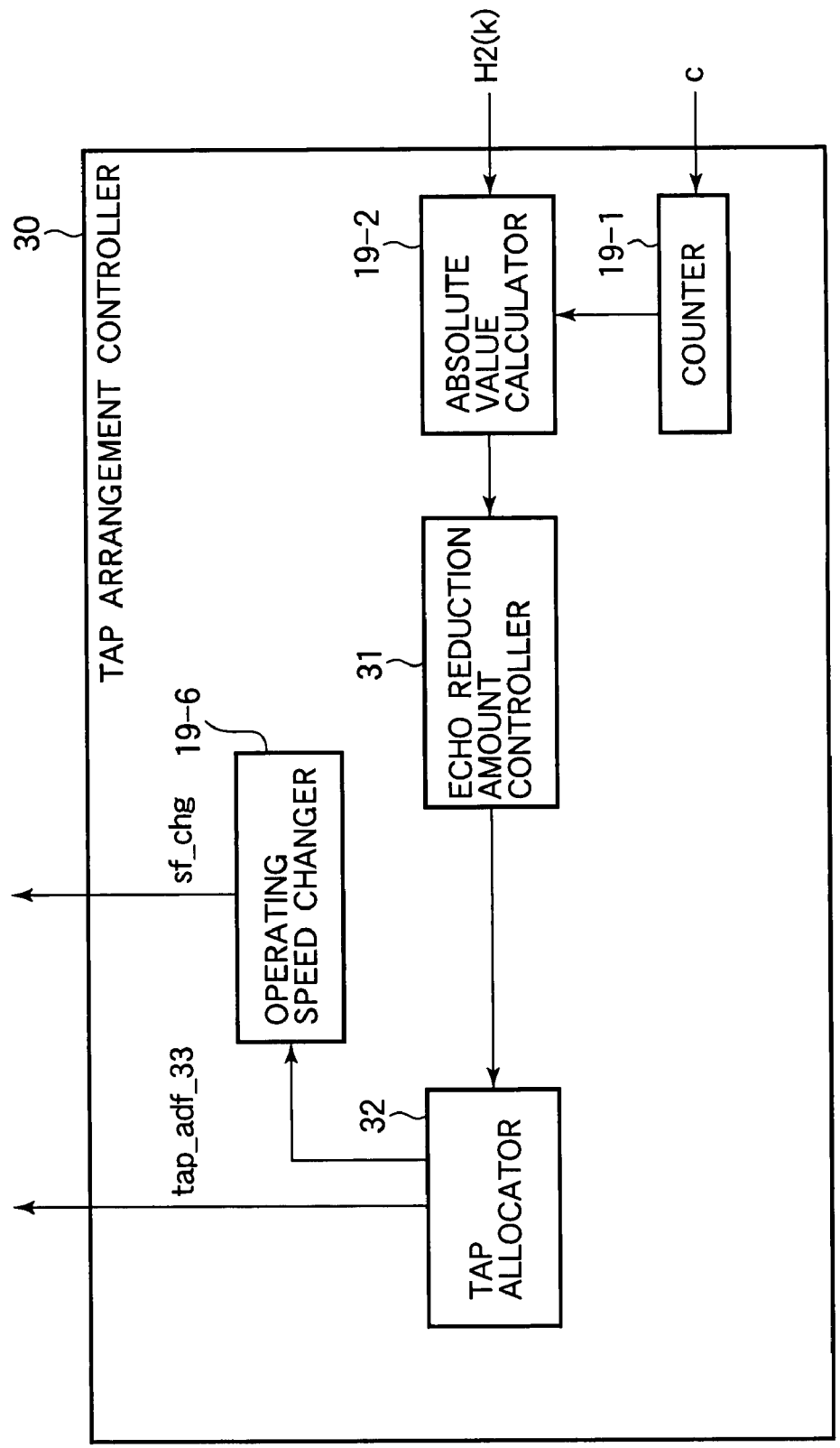
FIG. 13 is a block diagram showing a tap arrangement controller.
Figure 14A:
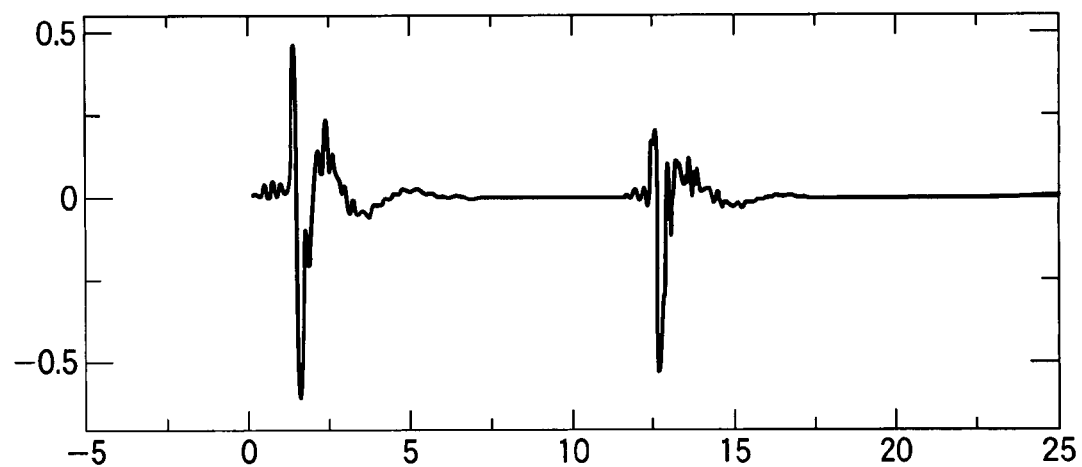
FIG. 14A is a graph showing an echo path at 8 kHz sampling.
Figure 14B:
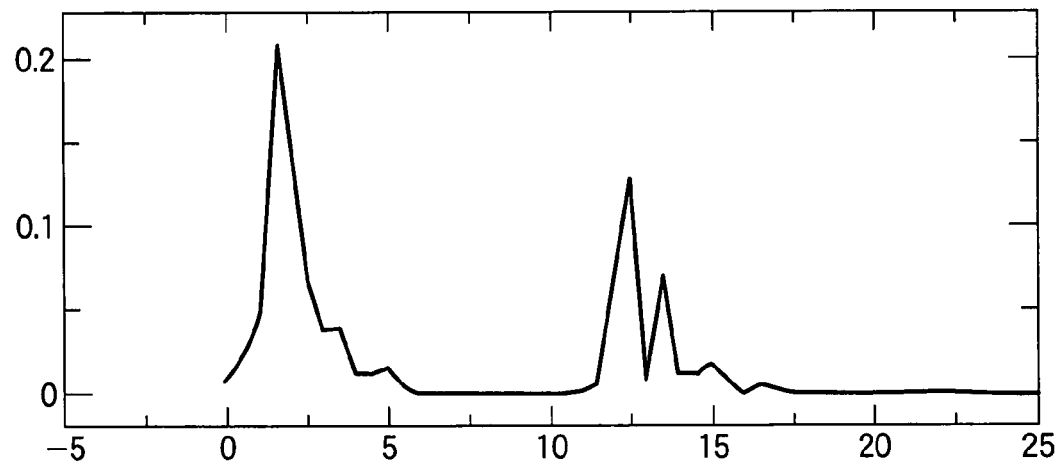
FIG. 14B is a graph showing absolute values of the coefficients H2(k) which are inputted to an absolute value calculator.
Figure 15:
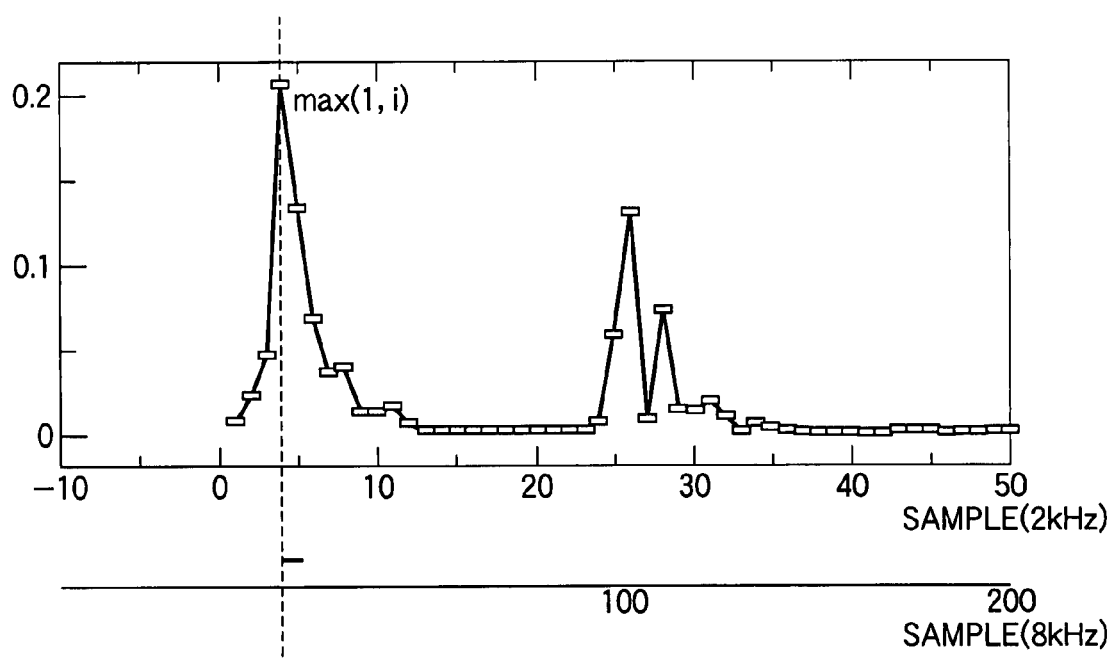
FIG. 15 is a graph indicating tap positions of the adaptive filter at low-rate sampling by box-shaped points.
Figure 16A:
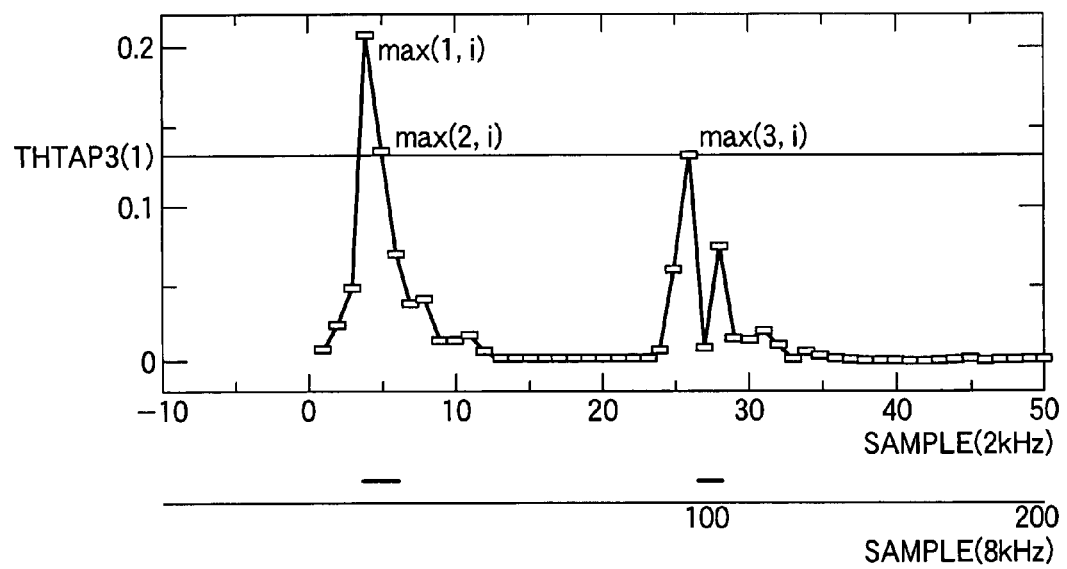
FIG. 16A is a graph indicating tap positions which are newly included in a range of THTAP3(1) or more by box-shaped points.
Figure 16B:
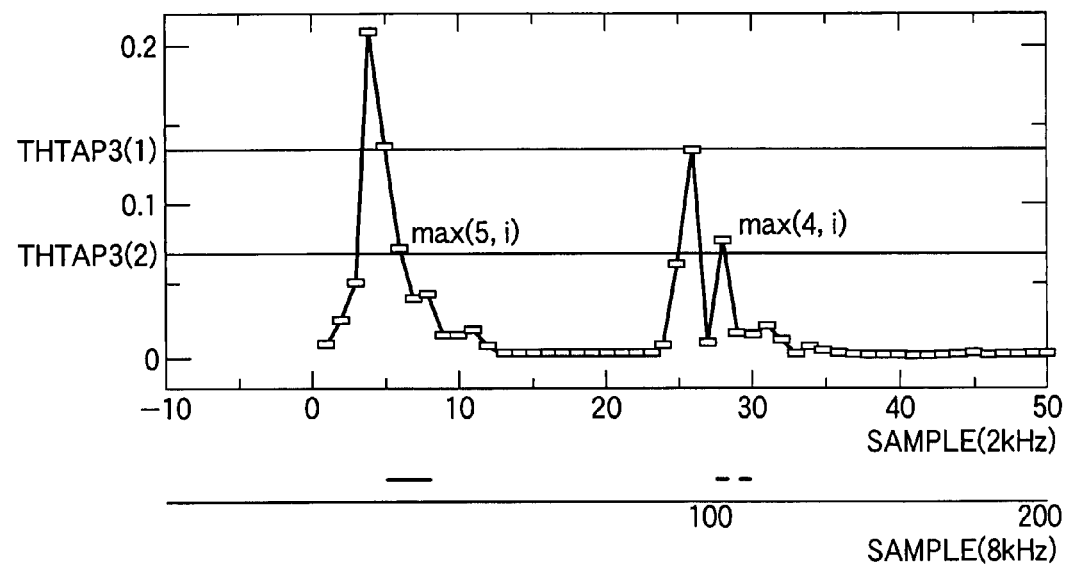
FIG. 16B is a graph indicating tap positions which are newly included in a range of THTAP3(2) or more by box-shaped points.

FIG. 12 is a block diagram showing a communication terminal apparatus having an echo canceller, FIG. 13 is a block diagram showing a tap arrangement controller, FIG. 14A is a graph showing an echo path at 8 kHz sampling, FIG. 14B is a graph showing absolute values of coefficients H2(k) inputted to an absolute value calculator, and FIG. 15 is a graph showing tap positions of the adaptive filter at low-rate sampling in box-shaped points. Further, FIG. 16A is a graph showing tap positions newly included in a range of THTAP3 (1) or more by box-shaped points, and FIG. 16B is a graph showing tap positions newly included in a range of THTAP3 (2) or more by box-shaped points.

The third embodiment is different from the second embodiment in a respect that the tap arrangement controller 20 is replaced by a tap arrangement controller 30, as shown in FIG. 12 and FIG. 13. The tap arrangement controller 30 is different in a respect that the tap arrangement controller 30 has an echo reduction amount controller 31 and a tap allocator 32. Except for the above-mentioned respects, the third embodiment is substantially the same as the second embodiment. Therefore, the same description is omitted here, and only the operation of the tap arrangement controller 30 will be described below.

The third embodiment is made in the light of a fact that an echo source portion having a larger delay in an echo path causes a greater degradation in communication quality.

Recently, it is often data in digital form that is transmitted through telephone transmission lines. In such a case, it is quite often seen that losses in the transmission lines are small. On the other hand, because transmission delay simply depends on distance, there may be a case of an echo path as shown in FIG. 14A. It can be seen from FIG. 14A that a response in a portion which has a great delay is not so much attenuated and has almost the same amplitude as a response in an early side portion which has a small delay, in comparison with the echo path waveform shown in FIG. 9A. In general, it is publicly known that an echo with a greater delay more seriously damages communication quality. The third invention is made in the light of this fact.

In a case of an echo path shown in FIG. 14A, an absolute value calculator 19-2 outputs a waveform shown in FIG. 14B in accordance with the above operation. At first, the echo reduction amount controller 31 obtains a maximum value of coefficients of the adaptive filter which converged at a low rate. The maximum value is determined in the same manner as the second embodiment, that is, the absolute value calculator 19-2 determines:

$$abs\_h2(i,L)=abs(h2(i,L))\ (i=0,\ldots,M-1) \quad (5).$$

The echo reduction amount controller 31 determines, from the maximum point of abs_h2(i,L), max(n,i) {N=1, . . . , BLOCK_LIMIT} sequentially from abs_h2(i,L) up to a predetermined (BLOCK_LIMIT)-th abs_h2(i,L).

Next, the echo reduction amount controller 31 calculates the maximum value of max(n,i), i.e., max(1,i) to output it to the tap allocator 32. The tap allocator 32 allocates W3 taps to the adaptive filter in the fullband echo canceller portion 18 equivalent to max(1,i) in substantially the same manner as the second embodiment. The tap assignment in the fullband echo canceller portion 18 is calculated in accordance with equation (14).

$$W3\_LF(1,i)=h8(W3 \times i,k)(i=1,\ldots,\text{BLOCK\_LIMIT}) \quad (14),$$

where $$W3=LargF/SmalF \text{ (4 in this embodiment)} \quad (15).$$

LargF is a sampling frequency of the fullband echo canceller portion 18, and SmalF is a sampling frequency of the low-rate adaptive filter.

This is explained with reference to FIG. 15. In FIG. 15, tap positions in the adaptive filter are illustrated by box-shaped points at low-rate sampling. In the lower part of FIG. 15, two horizontal axes representing the number of samples at 2 kHz sampling and that at 8 kHz sampling are illustrated for indicating temporal correlation between samples.

The echo reduction amount controller 31 calculates a first tap allocation threshold value THTAP3(1) in accordance with equation (16).

$$THTAP3(1)=\max(1,i) \times \text{down3} \quad (16),$$

where a symbol down3 denotes a coefficient which gives precedence to a tap having a large delay, and it is a constant which ranges $0.0 \leq \text{down3} \leq 1.0$.

If down3 is small, a tap having a larger delay takes precedence, and if down3 is large, amplitude of the absolute value has precedence over a delay.

Although a description has been made as to a case where down3=0.5 in this embodiment, a value of down3 is not limited to this example. The tap allocator 32 calculates a tap position corresponding to 8 kHz in order of delay size, in substantially the same manner as the second embodiment, among max (x,i) newly included in a range of THTAP3(1) or more, from a ratio between a low sampling rate and a sampling rate of the fullband echo canceller portion, and the tap allocator 32 thereby allocates taps of the adaptive filter of the fullband echo canceller portion 18. The operation will be explained with reference to FIG. 16A. When the tap allocation threshold value falls to THTAP3(1), max(2,i) and max (3,i) are newly included in a range equal to or more than the tap allocation threshold value. However, the tap allocator 32 firstly allocates the tap of the fullband echo canceller portion 18 to a position corresponding to max(3,i) having a larger delay, and subsequently allocates the tap of the fullband echo canceller portion 18 to a position corresponding to max(2,i). After the allocation is completed, for the next tap allocation, the echo reduction amount controller 31 further lowers THTAP3(2) as the following equation:

$$THTAP3(2)=\max(1,i) \times \text{down3} \times \text{down3}$$

and the taps are sequentially allocated as shown in FIG. 16B.

The tap allocator 32 sequentially allocates the taps of the fullband echo canceller portion 18.

Subsequently, in the same manner, $$THTAP3(n)=\max(1,i) \times (\text{down3})^n \quad (17),$$

and the echo reduction amount controller 31 lowers a reference fall threshold THTAP3 and outputs newly included max (x,i) (x is a variable) to the tap allocator 32. The tap allocator 32 allocates the taps of the adaptive filter of the fullband echo canceller portion 18 in decreasing order of delay size. If the assignable taps of the fullband echo canceller portion 18 are exhausted halfway through the allocation, the assignment terminates and a forward delay is assigned to the rest.

After finishing the tap allocation, the tap allocator outputs the tap coefficients tap_adf_33 to the fullband echo canceller portion 18, as in the embodiments described above.

As has been described above, in the third embodiment, the echo reduction amount controller 31 is provided, the reference fall threshold THTAP3 is sequentially lowered by only the amount of down3 from the maximum absolute value of the coefficients of the low-rate adaptive filter outputted from the absolute value calculator 19-2, and the tap allocator 32 firstly allocates the taps of the fullband echo canceller portion 18 to the low-rate filter portion having a larger delay in accordance with output of the echo reduction amount controller 31. Therefore, the third embodiment can have the following effects, in addition to the effects of the second embodiment. Since the taps of the fullband echo canceller portion 18 are assigned in accordance with not only the size of the response amplitude of the echo path which is a cause of an echo but also an echo source having a large delay, an echo can be efficiently canceled.

Even if a delay is large or even if an echo which occurs in echo source side with a large delay is large, an echo can be removed more appropriately and more comfortable communication quality without an echo can be provided, as compared with in the second embodiment.

Fourth Embodiment

The fourth embodiment of the present invention will be described below.

Figure 17:
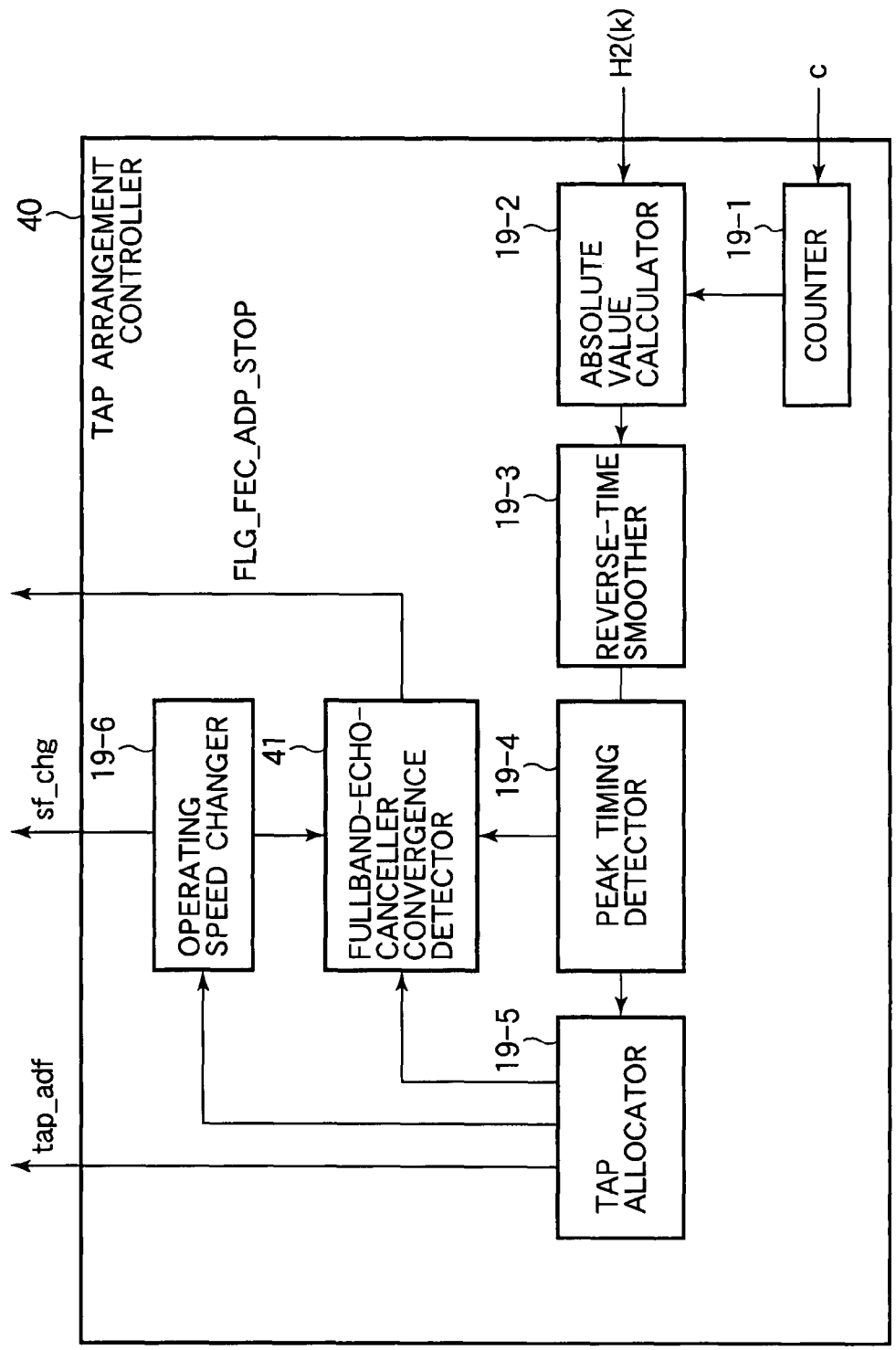
FIG. 17 is a block diagram showing a tap arrangement controller according to the fourth embodiment of the present invention.
Figure 18:
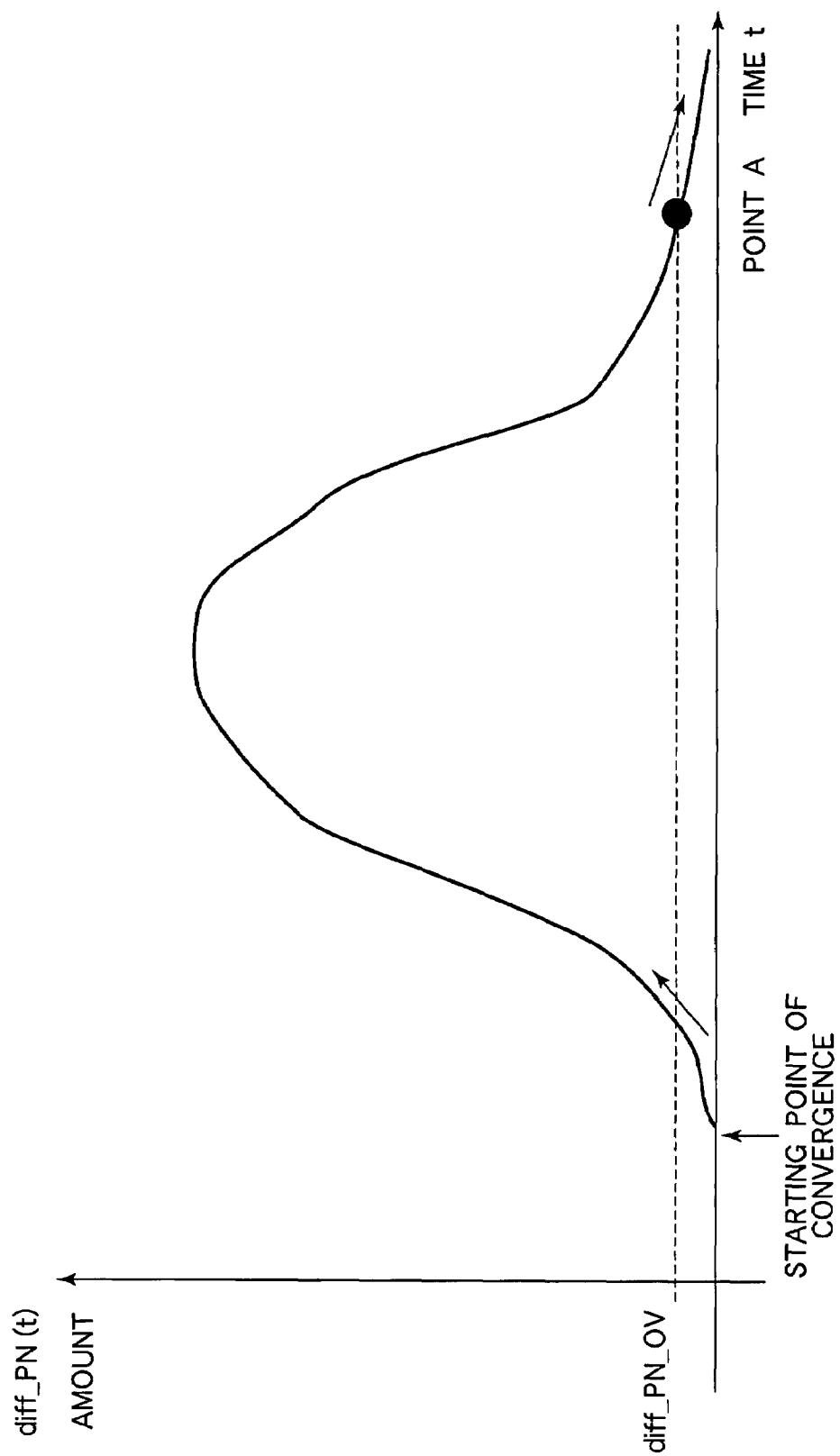
FIG. 18 is a graph showing a relationship between the amount of change of tap coefficients diff_PN(t) and time.

FIG. 17 is a block diagram showing a tap arrangement controller according to the fourth embodiment of the present invention, and FIG. 18 is a graph showing a relationship between amount of change of tap coefficients diff_PN(t) and time.

The fourth embodiment is different from the first embodiment in a respect that the tap arrangement controller 19 is replaced by a tap arrangement controller 40. Also, the tap arrangement controller 40 is different from tap arrangement controller 19 in a respect that a fullband-echo-canceller convergence detector 41 is newly provided in the tap arrangement controller 40. Except for the above-mentioned respects, the fourth embodiment is substantially the same as the first embodiment. Therefore, the same description is omitted here, and only the operation of the tap arrangement controller 40 will be described below.

The fullband-echo-canceller convergence detector 41 does not function until a tap arrangement of the fullband echo canceller portion 18 is determined and the adaptive filter 17 starts to operate as the fullband echo canceller portion 18.

Once the adaptive filter 17 starts to operate as the fullband echo canceller portion 18, the fullband-echo-canceller convergence detector 41 starts to operate as follows.

The fullband-echo-canceller convergence detector 41 receives the tap coefficients of the fullband echo canceller portion 18, which are determined in the same manner as in the first embodiment, from the tap allocator 19-5 and receives the peak positions P1 and P2, which are determined in the same manner as in the first embodiment, from the peak timing detector 19-4. Determining peak positions is substantially the same as that in the first embodiment.

When receiving an operating speed changing signal sf_chg from the operating speed changer 19-6. the fullband-echo-canceller convergence detector 41 calculates variation diff_PN(t) in tap coefficients (operates at 8 kHz sampling) at a Pn' position which is determined from the peak positions P1 and P2, out of the tap coefficients of the fullband echo canceller portion 18 which are not shown in the drawing, at a predetermined time interval, where $$Pn' = Pn \times \frac{\text{sampling frequency of fullband echo canceller portion}}{\text{low rate sampling frequency}}$$

$(n = 1, 2)$, and as follows:

$$\text{diff\_PN}(t) = \sum_{n=1}^{2} \{Pn'(t) - Pn'(t-T)\}^2. \tag{18}$$

Although a sum of squares is calculated in this embodiment, a sum of absolute values may be calculated.

A symbol diff_PN(t) is a variant indicating variation in the tap coefficients of the fullband echo canceller portion 18. Because Pn' is a tap element for producing the largest pseudo echo in the tap coefficients of the fullband echo canceller portion 18. An initial value of Pn' is zero when an initial value of the tap coefficient of the fullband echo canceller portion 18 is zero.

Also, as a matter of course, in a case that the fullband echo canceller portion 18 does not operate from the initial state, or in a case that the updating of the coefficients is held stopped for some reason, the values of the tap coefficients of the fullband echo canceller portion 18 remain zero.

Accordingly, a characteristic of diff_PN(t) is that the value of diff_PN(t) is initially zero, then becomes greater when the coefficients start to grow, and return to zero after the coefficients finished to grow, in accordance with substantial growth of the tap coefficients of the adaptive filter 17 in the fullband echo canceller portion 18, as shown in FIG. 18.

For this reason, a coefficient control threshold diff_PN_OV is determined in advance. The threshold diff_PN_OV is a threshold, as described below, for controlling to stop the updating of the filter-coefficients of the fullband echo canceller portion 18, not shown in the drawing.

$$\text{diff\_PN\_OV} = \delta 4 \times Y8AV(k) \tag{19}$$

where a short-time average value of y8(k) is Y8AW(k). Although in this embodiment, an average for 5 ms is calculated for a short-time average value of y8(k) and therefore $\delta 4 = 0.01$ is obtained. However, the calculation of the short-time average value is not limited to this example and is set in accordance with conditions if necessary.

The fullband-echo-canceller convergence detector 41 sets a convergence detection auxiliary counter FEC_ADP_STOP to a value of one, not shown in the drawing, once the following equation is satisfied:

$$\text{diff\_PN}(t) > \text{diff\_PN\_OV} \tag{20}.$$

Next, when the substantial growth of the tap coefficients of the adaptive filter 17 in the fullband echo canceller portion 18 progresses and echo cancellation starts, diff_PN(t) falls again and accordingly a point A at which both of the following equations (21) and (22) are satisfied is detected. In a case that the following values are detected at the point A in FIG. 18:

$$\text{diff\_PN}(t) < \text{diff\_PN\_OV} \tag{21},$$

$$\text{FEC\_ADP\_STOP} = 1 \tag{22},$$

and a signal FLG_FEC_ADP_STOP for stopping updating of the coefficients of the adaptive filter 17 in the fullband echo canceller portion 18 is inputted to the fullband echo canceller portion 18 and the fullband echo canceller portion 18 stops the updating of the coefficients.

As has been described above, in this embodiment, the following advantages can be obtained in addition to those in the first embodiment. The fullband-echo-canceller convergence detector 41 receives a tap position which is most influenced by an echo path from the peak timing detector 19-4, calculates variation in the influential tap value among the taps of the fullband echo canceller portion 18 which are allocated by the tap allocator 19-5 in a fixed period of time, determines that the fullband echo canceller portion terminates to converge when the variation decreases except in an early convergence period, stops the taps of the adaptive filter 17 in the fullband echo canceller portion 18, and thereby coefficients disturbance in the fullband echo canceller portion 18 can be prevented. Moreover, after the convergence of the echo canceller portion, the coefficients of the fullband echo canceller portion 18 are not disturbed even if double talk occurs, and thereby the echo canceller having superior bi-directional communication can be realized.

Fifth Embodiment

The fifth embodiment of the present invention will be described below.

Figure 19:
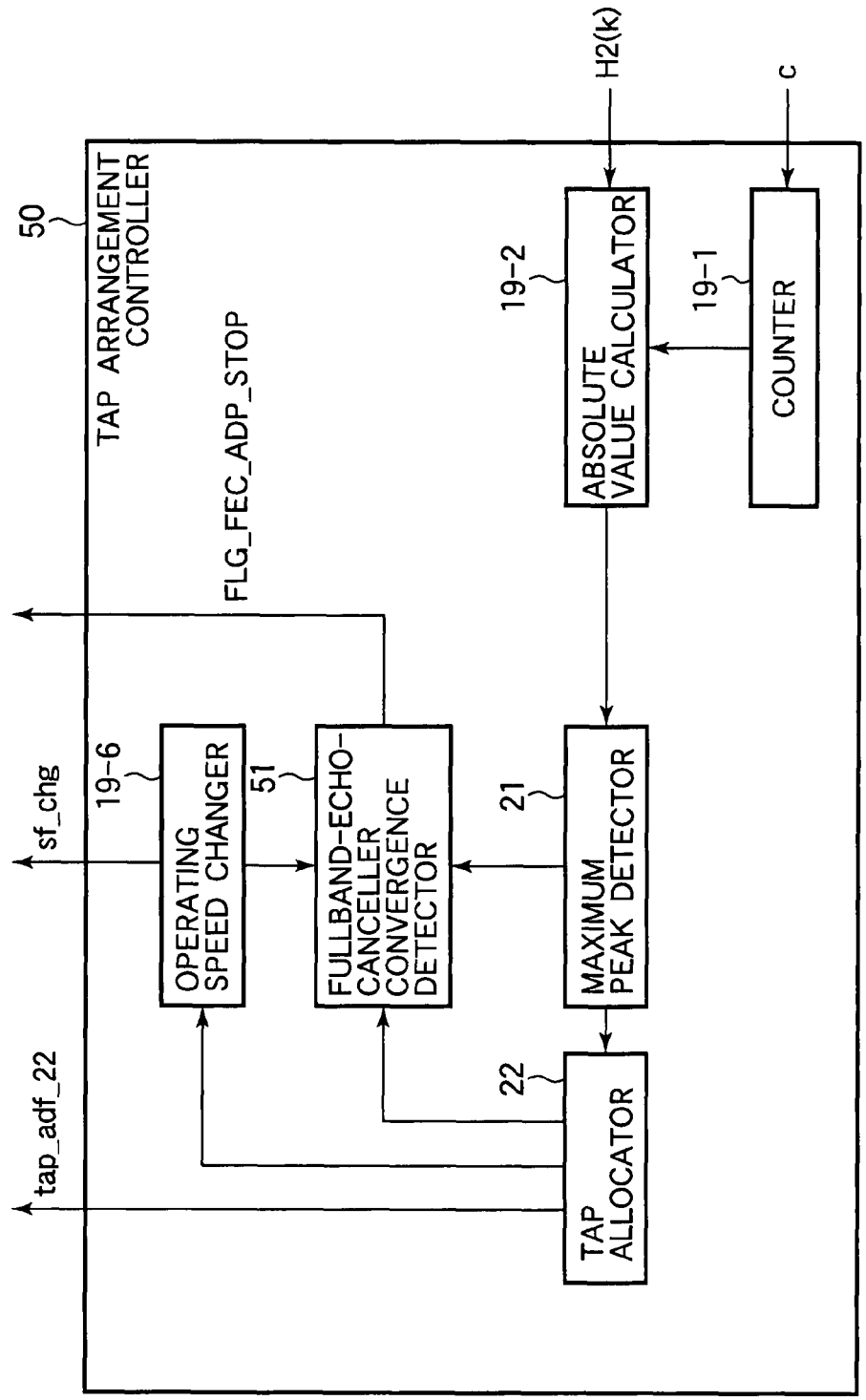
FIG. 19 is a block diagram showing a tap arrangement controller according to the fifth embodiment of the present invention.

FIG. 19 is a block diagram showing a tap arrangement controller in the fifth embodiment of the present invention.

The fifth embodiment is different from the second embodiment in a respect that the tap arrangement controller 20 is replaced by a tap arrangement controller 50. A different point in the tap arrangement controller 50 is that a fullband-echo-canceller convergence detector 51 is newly provided. The fifth embodiment is substantially the same as the second embodiment except for the above-mentioned respects. Therefore, the same description is omitted here, and only the operation of the fullband-echo-canceller convergence detector 51 in the tap arrangement controller 50 will be described below.

The fullband-echo-canceller convergence detector 51 receives, from the maximum peak detector 21, a value acquired by calculating a tap W2_LF(1,i) of the fullband echo canceller portion 18 corresponding to the i-th tap among max(1,i) at a low rate in accordance with equation (13):

$$W2\_LF(1,i) = h8(W2 \times i,k)(i=1,\ldots,\text{BLOCK\_LIMIT}) \tag{13},$$

where h8(t,k) denotes the k-th tap of the fullband echo canceller portion 18 which operates at 8 kHz in the same manner as described in the first embodiment. The tap coefficients of the fullband echo canceller portion 18 which are determined to be allocated, not shown in the drawing, are inputted to the fullband-echo-canceller convergence detector 51 from the tap allocator 22.

On the other hand, an operating speed changing signal sf_chg is received from the operating speed changer 19-6. The fullband-echo-canceller convergence detector 51 does not function until it receives the operating speed changing signal sf_chg from the operating speed changer 19-6. Once receiving the operating speed changing signal sf_chg from the operating speed changer 19-6, the fullband-echo-canceller convergence detector 51 determines that the adaptive filter 17 starts to function as the fullband echo canceller portion 18 and operates as follows.

At first, diff_W2_LF(t) is calculated in accordance with equation (23).

$$\text{diff\_W2\_LF}(t) = \sum_{n=1}^{10} \{W2\_LF(n, i, t) - W2\_LF(n, i, t-T)\}^2. \tag{23}$$

n: number of the coefficients to be used for convergence detection from the maximum (1 to 10 in this embodiment).
i: a value indicating what number of samples at a low rate the n-th maximum value in the second embodiment corresponds to.
t: time.
T: a predetermined time interval (5 ms in this embodiment).

As can be understood from equation (23), the meaning of diff_W2_LF(t) is growth of the coefficients, as well as that of diff_PN(t) in the fourth embodiment. There is a difference, however, that ten coefficients in descending order from the maximum coefficient can be monitored in the fifth embodiment, contrasted with in the fourth embodiment in which two filter coefficients being large values are used as diff_PN(t). Also, diff_W2_LF(t) has the same characteristic curve as that shown in FIG. 18 and described in the fourth embodiment, in accordance with progress in convergence of the fullband echo canceller portion 18. In the fifth embodiment, a vertical coordinate in FIG. 18 is read as diff_W2_LF(t). Thus, also in this embodiment, the convergence of the fullband echo canceller portion 18 can be determined and updating coefficients can be controlled in substantially the same manner as in the fourth embodiment.

When a coefficient control threshold diff_W2_LF_OV is determined in advance and a short-time average value of y8(k) is Y8AV(k), diff_W2_LF_OV is expressed as follows:

$$\mathit{diff\_W2\_LF\_OV} = \delta 5 \times Y8AV(k) \tag{24}$$

Although this embodiment calculates the average for 5 ms for the short-time average value of y8(k), and δ5=0.01 is obtained. However, calculation of the short-time average value is not limited to this example and can be set in accordance with various conditions if necessary.

The fullband-echo-canceller convergence detector 51 sets a convergence detection auxiliary counter FEC_ADP_STOP which is not shown in the drawings to a value of one, once the following equation is satisfied:

$$\mathit{diff\_W2\_LF}(t) > \mathit{diff\_W2\_LF\_OV} \tag{25}$$

Next, when substantial growth of tap coefficients of the adaptive filter 17 in the fullband echo canceller portion 18 progresses and echo is cancelled, diff_W2_LF(t) falls again, and accordingly a point at which both of the following equations (26) and (27) are satisfied is detected. Then, the following are detected:

$$\mathit{diff\_W2\_LF} < \mathit{diff\_W2\_LF\_OV} \tag{26},$$

$$\mathrm{FEC\_ADP\_STOP}=1 \tag{27},$$

and a signal FLG_FEC_ADP_STOP for stopping updating of the coefficients of the adaptive filter 17 in the fullband echo canceller portion 18 is inputted to the fullband echo canceller portion 18. Thus, the fullband echo canceller portion 18 stops the updating of the coefficients.

As has been described above, in this embodiment, the following advantages can be obtained in addition to those in the second embodiment. The fullband-echo-canceller convergence detector 51 receives the tap positions in order of influence of an echo path from the maximum peak detector 21, calculates the variation in the influential tap values in a fixed period of time among the taps of the fullband echo canceller portion 18 which are allocated by the tap allocator 22, determines that the echo canceller portion terminates to converge when the variation decreases except in an early convergence period, stops the taps of the adaptive filter 17 in the fullband echo canceller portion 18, and thereby coefficients disturbance in the fullband echo canceller portion 18 can be prevented. Moreover, since the coefficients of the fullband echo canceller portion 18 are not disturbed even if double talk occurs after the convergence of the echo canceller portion, the echo canceller portion having superior bi-directional communication can be realized.

Sixth Embodiment

The sixth embodiment of the present invention will be described below.

Figure 20:
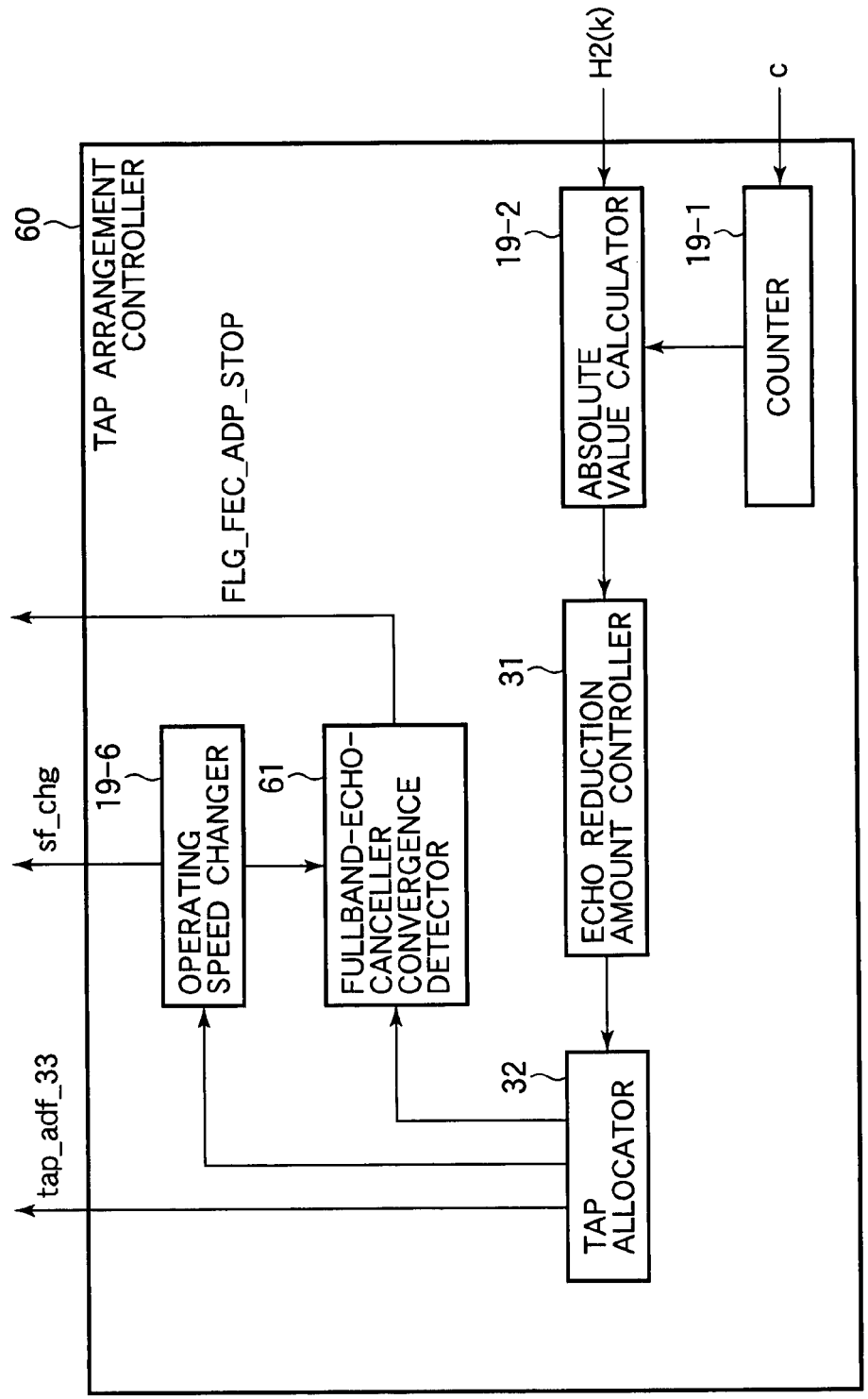
FIG. 20 is a block diagram showing a tap arrangement controller according to the sixth embodiment of the present invention.

FIG. 20 is a block diagram showing a tap arrangement controller according to the sixth embodiment of the present invention.

The sixth embodiment is different from the third embodiment in a respect that a fullband-echo-canceller convergence detector 61 is newly provided in the tap arrangement controller 60. Except for the above-mentioned respect, this embodiment is substantially the same as the third embodiment. Therefore, the same description is omitted here, and only the operation of the fullband-echo-canceller convergence detector 61 will be described below.

The fullband-echo-canceller convergence detector 61 does not function until it receives a changing signal sf_chg from the operating speed changer 19-6. Once receiving the changing signal sf_chg, the fullband-echo-canceller convergence detector 61 determines that the adaptive filter 17 functions as a filter of the fullband echo canceller portion 18 and operates as follows.

In the fullband-echo-canceller convergence detector 61, max (x,i) (x is not determined) which is contained in the reference range of equation (17) calculated by the tap allocator 32 in the third embodiment is provided from the tap allocator 32 to the fullband-echo-canceller convergence detector 61.

$$\mathit{THTAP3}(n) = \max(1,i) \times (\mathrm{down3})^n \tag{17}$$

For each of max (x,i) contained in the range, its corresponding tap W6_LF(x,i) of the fullband echo canceller portion 18 is calculated in accordance with equation (28).

$$W6\_LF(x,i) = h8(W6 \times i, k) \tag{28}$$

That is, it means that max(x,i) (the x-th largest low-rate tap in amplitude) is correspondingly assigned to h8(W6×i,k), i.e. the coefficients of the (W6×i)-th tap in the fullband echo canceller portion 18 which operates at 8 kHz.

Here, W6 is a ratio between a sampling frequency of the fullband echo canceller portion 18 and a sampling frequency when the adaptive filter 17 operates at a low rate. Although W6 in this embodiment equals to W2 in the second embodiment, it is not limited to this example. It is also available to add an adequate margin to W6.

Next, the fullband-echo-canceller convergence detector 61 calculates diff_W6_LF(t) in accordance with equation (29):

$$\mathrm{diff\_W6\_LF}(t) = \sum_{n}^{M6} \{W6\_LF(n, t) - W6\_LF(n, t-T)\}^2. \tag{29}$$

n: number of the falls of the threshold value from the maximum. max(x,i) to be used for convergence detection are contained in the reference range determined using the threshold value after the n falls (n ranges from 1 to 3 in this embodiment).

t: time.

T: a predetermined time interval (5 ms in this embodiment).

As can be understood from equation (29), the meaning of diff_W6_LF(t) is substantially the same as that of diff_PN(t) in the fourth embodiment. There is a difference, however, diff_PN(t) in the fourth embodiment uses two filter coefficients, on the other hand, when a threshold falls n times, corresponding 8 kHz-sampling coefficients of the fullband echo canceller portion 18 can be monitored by using all of the contained max(x,i) as a key in the sixth embodiment.

In the sixth embodiment, diff_W6_LF(t) has the same characteristic curve as that shown in FIG. 18 and described in the fourth embodiment, as the fullband echo canceller portion 18 converges. The vertical coordinate in FIG. 18 can be read as diff_W6_LF(t). Accordingly, in this embodiment, as described in the fourth embodiment, convergence degree determination for the adaptive filter 17 in the fullband echo canceller portion 18 and controlling the updating of the coefficients are available.

Firstly, a coefficient control threshold diff_W6_LF_OV is determined in advance. The value of diff_W6_LF_OV can be obtained as follows, when a short-time average value of y8(k) is Y8AV(k):

$$diff\_W6\_LF\_OV = \delta 6 \times Y8AV(k) \quad (30).$$

Although an average for 5 ms is calculated as the short-time average value of y8(k) and δ6=0.01 is used in this embodiment, it is not limited to this example and it can be set in accordance with conditions if necessary. The fullband-echo-canceller convergence detector 61 sets a convergence detection auxiliary counter FEC_ADP_STOP which is not shown in the drawing to a value of one, once the following equation is satisfied:

$$diff\_W6\_LF(t) > diff\_W6\_LF\_OV \quad (31).$$

Next, when substantial growth of tap coefficients of the adaptive filter 17 in the fullband echo canceller portion 18 progresses and echo cancellation starts, diff_W6_LF(t) falls again, and accordingly a point in which both of equations (26) and (27) are satisfied is detected. When the followings are detected:

$$diff\_W6\_LF(t) < diff\_W6\_LF\_OV \quad (32),$$

$$FEC\_ADP\_STOP = 1 \quad (33),$$

and a signal FLG_FEC_ADP_STOP for stopping the updating of the coefficients of the adaptive filter 17 in the fullband echo canceller portion 18 is outputted to the fullband echo canceller portion 18 which is not shown in the drawing and the fullband echo canceller portion 18 stops the updating of the coefficients.

As has been described above, in the sixth embodiment, the following advantages can be obtained in addition to the third embodiment: the fullband-echo-canceller convergence detector 61 extracts a tap allocation criterion of the fullband echo canceller portion 18 and extracts the tap having a long delay time and large amplitude and causing an echo at the n-th fall of the threshold, from the tap allocator 32, by using the adaptive filter 17 tap order at a low rate contained in a range determined by the n-th fallen threshold as a key, the fullband-echo-canceller convergence detector 61 calculates variation of influential tap values in a fixed period of time, determines that the fullband echo canceller portion terminates to converge when the variation decreases except in an early convergence period, and then stops the taps of the adaptive filter 17 in the fullband echo canceller portion 18. Therefore, even if an echo path has a longer delay time in comparison with the fifth embodiment, convergence condition can be more precisely detected and can stop the updating of the coefficients of the adaptive filter 17. Moreover, there is no disturbance of the coefficients in the fullband echo canceller portion 18 even if double talk state occurs after convergence of the echo canceller. Therefore, the echo canceller preventing audio degradation in the face of double talk and having superior bi-directional communication can be realized.

What is claimed is:

1. An echo canceller for cancelling an echo caused by an audio signal, comprising:
    an adaptive filter which is used both for performing echo cancellation and for detecting an echo occurrence position; and
    an adder, which adds a pseudo echo generated by the adaptive filter to the echo, so that the echo and the pseudo echo canceled to each other;
    a downsampling side signal path including a side performing the downsampling, which is a part of a subband filter and a sampling converter for downsampling the audio signal;
    a fullband echo cancellation side signal path for using the adaptive filter as a fullband echo canceller portion for the audio signal not flowing through the downsampling side signal path;
    a selector switch which appropriately switches between the downsampling side signal path and the fullband echo cancellation side signal path to input the audio signal; and
    a tap arrangement controller which optimizes a tap arrangement by using coefficients which are updated by the adaptive filter used for detecting the echo occurrence position by using a downsampled signal, the downsampled signal being generated through the downsampling by the subband filter and the sampling converter, the tap arrangement controller outputting the optimized tap arrangement to the adaptive filter;
    wherein, when the adaptive filter receives the tap arrangement optimized and outputted by the tap arrangement controller, the selector switch selects between the downsampling side signal path and the side performing the fullband echo cancellation, so that the adaptive filter is used for the fullband echo cancellation in accordance with the optimized tap arrangement.

2. The echo canceller according to claim 1, wherein the tap arrangement controller includes:
    a convergence determining means which determines whether convergence of the adaptive filter at a low rate is completed;
    an absolute value calculating means which calculates absolute values of adaptive filter coefficients at a low rate after the convergence determining means determines that the convergence is completed;
    a reverse-order time sampling smoothing means which smoothes the absolute values of the adaptive filter coefficients calculated by the absolute value calculating means;
    a peak detecting means which detects peak timing of the absolute values of the adaptive filter coefficients smoothed by the reverse-order time sampling smoothing means;
    a tap allocating means which allocates a tap coefficient to the peak by using a position of the peak timing detected by the peak detecting means, as a criterion of judgment of a tap assignment position of the adaptive filter at time of the fullband echo cancellation, thereby optimizing the tap arrangement; and an operating speed changing means which switches a sampling frequency for the adaptive filter to a sampling frequency for the side performing the fullband echo cancellation and causes the selector switch to select the side performing the fullband echo cancellation, when the adaptive filter receives the tap arrangement optimized and outputted by the tap allocating means.

3. The echo canceller according to claim 2, wherein
the convergence determining means includes a counter which counts number of times that the updating of the coefficients is performed at a downsampling frequency in the adaptive filter, and
the convergence determining means determines that the convergence at a low rate is completed when the counted number of times reaches a predetermined number.

4. The echo canceller according to claim 2, wherein
the reverse-order time sampling smoothing means smoothes the absolute values of the adaptive filter coefficients in a reverse time direction.

5. The echo canceller according to claim 2, wherein
the tap allocating means uses the position of the peak timing as a starting point of assignment of tap coefficients of the adaptive filter at time of the fullband echo cancellation.

6. The echo canceller according to claim 5, wherein
the tap allocating means allocates the tap coefficients to portions of the adaptive filter which need the tap coefficients and allocates a simple delay obtained without calculation to other portions of the adaptive filter.

7. The echo canceller according to claim 1, wherein
the tap arrangement controller includes:
a convergence determining means which determines whether convergence of the adaptive filter at a low rate is completed;
an absolute value calculating means which calculates absolute values of adaptive filter coefficients at a low rate after the convergence determining means determines that the convergence is completed;
a maximum peak detecting means which detects the absolute values of the adaptive filter coefficients calculated by the absolute value calculating means in decreasing order;
a tap allocating means which allocates tap coefficients intensively to positions of a larger absolute value detected by the maximum peak detecting mean, thereby optimizing the tap arrangement; and
an operating speed changing means which switches a sampling frequency for the adaptive filter to a sampling frequency for the side performing the fullband echo cancellation and causes the selector switch to switch to the side performing fullband echo cancellation, when the adaptive filter receives the tap arrangement optimized and outputted by the tap allocating means.

8. The echo canceller according to claim 7, wherein
the convergence determining means includes a counter which counts number of times that the updating of the coefficients is performed at a downsampling frequency, and
the convergence determining means determines that the convergence at a low rate is completed when the counted number of times reaches a predetermined number.

9. The echo canceller according to claim 8, wherein
the tap allocating means uses a position of timing inputted from the maximum peak detecting means as a criterion of judgment of tap assignment positions of the adaptive filter, and
the tap allocating means allocates tap coefficients using the position of the timing as a starting point for the allocating, number of the allocated tap coefficients being determined in accordance with a ratio $$W2 = LargF/SmalF$$

between SmalF which is a sampling frequency at a low rate and LargF which is a sampling frequency for the fullband echo canceller portion.

10. The echo canceller according to claim 7, wherein
the tap allocating means uses a position of timing inputted from the maximum peak detecting means as a criterion of judgment of tap assignment positions of the adaptive filter, and
the tap allocating means allocates tap coefficients using the position of the timing as a starting point for the allocating, number of the allocated tap coefficients being determined in accordance with a ratio $$W2 = LargF/SmalF$$

between SmalF which is a sampling frequency at a low rate and LargF which is a sampling frequency for the fullband echo canceller portion.

11. The echo canceller according to claim 10, wherein
the sampling frequency has a margin for avoiding occurrence of interruption in the allocated filter coefficients.

12. The echo canceller according to claim 11, wherein
the tap allocating means uses a position of timing inputted from the maximum peak detecting means as a criterion of judgment of tap assignment positions of the adaptive filter, and
the tap allocating means allocates tap coefficients using the position of the timing as a starting point for the allocating, number of the allocated tap coefficients being determined in accordance with a ratio $$W2 = LargF/SmalF$$

between SmalF which is a sampling frequency at a low rate and LargF which is a sampling frequency for the fullband echo canceller portion.

13. The echo canceller according to claim 10, wherein
the tap allocating means uses a position of timing inputted from the maximum peak detecting means as a criterion of judgment of tap assignment positions of the adaptive filter, and
the tap allocating means allocates tap coefficients using the position of the timing as a starting point for the allocating, number of the allocated tap coefficients being determined in accordance with a ratio $$W2 = LargF/SmalF$$

between SmalF which is a sampling frequency at a low rate and LargF which is a sampling frequency for the fullband echo canceller portion.

14. The echo canceller according to claim 7, wherein
the tap arrangement controller includes a fullband-echo-canceller convergence detecting means, which
receives, from the maximum peak detecting means, a tap position which is most influenced by an echo path;
calculates a degree of variation in influential tap values among the tap coefficients of the fullband echo canceller portion which are allocated by the tap allocating means, in a fixed period of time;

determines that convergence of the fullband echo canceller portion is completed when the degree of the variation decreases in a period other than an early convergence period; and stops the allocating of the tap coefficients to the adaptive filter in the fullband echo canceller portion.

15. The echo canceller according to claim 1, wherein the tap arrangement controller includes:

a convergence determining means which determines whether convergence of the adaptive filter at a low rate is completed;

an absolute value calculating means which calculates absolute values of adaptive filter coefficients at a low rate after the convergence determining means determines that the convergence is completed;

an echo reduction amount controlling means which lowers a reference fall threshold gradually from a maximum of the absolute values of the adaptive filter coefficients at a low rate, which is outputted from the absolute value calculating means, in accordance with a coefficient which gives precedence to a tap having a large delay, thereby specifying the peak;

a tap allocating means which allocates tap coefficients of the adaptive filter at time of the fullband echo cancellation preferentially to a low-rate filter portion having a large delay, in accordance with an output of the echo reduction amount controlling means, thereby optimizing the tap arrangement; and an operating speed changing means which switches a sampling frequency for the adaptive filter to a sampling frequency for the side performing the fullband echo cancellation and causes the selector switch to select the side performing fullband echo cancellation, when the adaptive filter receives the tap arrangement optimized and outputted by the tap allocating means.

16. The echo canceller according to claim 15, wherein the convergence determining means includes a counter which counts number of times that the updating of the coefficients is performed at a downsampling frequency, and the convergence determining means determines that the convergence at a low rate is completed when the counted number of times reaches a predetermined number.

17. The echo canceller according to claim 15, wherein the tap arrangement controller includes a fullband-echo-canceller convergence detecting means, which extracts, from the tap allocator, a criterion of the tap assignment of the fullband echo canceller portion after n threshold-falls and taps having long delay time and large amplitude, the taps causing an echo, by using an order of the taps of the adaptive filter at a low rate, values of the taps of the adaptive filter exceed a threshold after the n threshold-falls;

calculates a degree of variation in influential tap values in a fixed period of time;

determines that convergence of the fullband echo canceller portion is completed when the degree of the variation decreases in a period other than an early convergence period; and stops the allocating of the tap coefficients to the adaptive filter in the fullband echo canceller portion.

18. The echo canceller according to claim 7, wherein the tap allocating means uses a position of timing inputted from the maximum peak detecting means as a criterion of judgment of tap assignment positions of the adaptive filter, and the tap allocating means allocates tap coefficients using the position of the timing as a starting point for the allocating, number of the allocated tap coefficients being determined in accordance with a ratio $$W2=LargF/SmalF$$

between SmalF which is a sampling frequency at a low rate and LargF which is a sampling frequency for the fullband echo canceller portion.

19. The echo canceller according to claim 2, wherein the tap arrangement controller includes a fullband-echo-canceller convergence detecting means, which receives, from the peak detecting means, a tap position which is most influenced by an echo path;

calculates a degree of variation in influential tap values among the tap coefficients of the fullband echo canceller portion which are allocated by the tap allocating means, in a fixed period of time;

determines that convergence of the fullband echo canceller portion is completed when the degree of the variation decreases in a period other than an early convergence period; and stops the allocating of the tap coefficients to the adaptive filter in the fullband echo canceller portion.

* * * * *